United States Patent
Popovic et al.

(10) Patent No.: US 12,509,367 B1
(45) Date of Patent: Dec. 30, 2025

(54) DROP-IN TREATMENT APPARATUS, SYSTEM, AND METHOD FOR PFAS-IMPACTED LIQUIDS

(71) Applicant: The United States of America, as represented by the Secretary of the Navy, Arlington, VA (US)

(72) Inventors: Jovan Popovic, Ventura, CA (US); John J. Kornuc, Malibu, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 463 days.

(21) Appl. No.: 18/303,364

(22) Filed: Apr. 19, 2023

Related U.S. Application Data

(63) Continuation-in-part of application No. 17/226,543, filed on Apr. 9, 2021, now Pat. No. 11,667,546.
(Continued)

(51) Int. Cl.
| | |
|---|---|
| *C02F 1/28* | (2023.01) |
| *C02F 1/42* | (2023.01) |
| *C02F 101/36* | (2006.01) |

(52) U.S. Cl.
CPC .............. *C02F 1/283* (2013.01); *C02F 1/285* (2013.01); *C02F 1/42* (2013.01);
(Continued)

(58) Field of Classification Search
CPC .. C02F 1/283; C02F 1/285; C02F 1/42; C02F 2001/422; C02F 2001/425; C02F 2101/36;
(Continued)

(56) References Cited

U.S. PATENT DOCUMENTS

| | | |
|---|---|---|
| 5,193,709 A | 3/1993 | Brassell |
| 5,366,642 A | 11/1994 | Platter et al. |
| | (Continued) | |

FOREIGN PATENT DOCUMENTS

| | | |
|---|---|---|
| WO | WO2014022704 | 2/2014 |

OTHER PUBLICATIONS

Du et al., Adsorption behavior and mechanism of perfluorinated compounds on various adsorbents—A review, journal, Elsevier, Apr. 25, 2014, United States.
(Continued)

*Primary Examiner* — Magali P Slawski
*Assistant Examiner* — Bernadette Karen Mcgann
(74) *Attorney, Agent, or Firm* — Naval Facilities Engineering and Expeditionary Warfare Center; Jimmy M. Sauz

(57) ABSTRACT

A drop-in treatment apparatus, system, and method for treating PFAS-impacted liquids. The drop-in treatment apparatus may comprise a cartridge having a plurality openings; a mesh container disposed within the cartridge; a submersible pump coupled to the cartridge; and a power source electrically coupled to the submersible pump. The drop-in treatment apparatus may further comprise a prescribed mass of sorbent or resin filled within the mesh container, such that the prescribed mass of sorbent or resin may be disposed within the cartridge. The prescribed mass of sorbent or resin may be configured to remove PFAS compounds from a liquid and may be in the range of 0.1-50,000 milligrams per milliliter of liquid volume to be treated. The liquid is preferably stored within a drum container, and the drop-in treatment apparatus is preferably submerged into the liquid. The sorbent may be pyrogenic carbon, granular activated carbon, biochar, zeolite, aluminosilicates, and combinations thereof.

20 Claims, 14 Drawing Sheets

Related U.S. Application Data

(60) Provisional application No. 63/123,101, filed on Dec. 9, 2020.

(52) U.S. Cl.
CPC .. *C02F 2001/422* (2013.01); *C02F 2001/425* (2013.01); *C02F 2101/36* (2013.01); *C02F 2201/006* (2013.01)

(58) Field of Classification Search
CPC .......................... C02F 2201/006; C02F 1/28; C02F 2001/427; C02F 1/583; C02F 2101/12; C02F 2101/14; C02F 2103/00; C02F 1/685; C02F 1/687; C02F 1/001; C02F 1/281; F04B 23/02; F04B 23/021; F04B 222/251; F04B 222/255; B67D 7/58; B67D 7/68; B67D 7/76; B67D 7/766; B01J 2220/62; B01J 2220/66; B01D 35/0273; B01D 35/0276; B01D 35/027

See application file for complete search history.

(56) References Cited

U.S. PATENT DOCUMENTS

| | | | |
|---|---|---|---|
| 6,875,364 | B2 | 4/2005 | Gordon |
| 7,807,726 | B2 | 10/2010 | Maurer et al. |
| 2004/0094470 | A1* | 5/2004 | Jackson ............... B01D 29/114 210/411 |
| 2005/0263450 | A1 | 12/2005 | McGrew, Jr. |
| 2011/0247970 | A1 | 10/2011 | Evingham |

OTHER PUBLICATIONS

Park et al., Adsorption of perfluoroalkyl substances (PFAS) in groundwater by granular activated carbons, journal, Elsevier, Dec. 1, 2019, United States.
Llorca et al., Adsorption of perfluoroalkyl substances on microplastics under environmental conditions, journal, Elsevier, Dec. 20, 2017, United States.
EPA, An integrated data hub for per-and polyfluoroalkyl (PFAS) chemicals to support Non-Targeted Analysis via the US-EPA CompTox Chemicals Dashboard, brochure, Nov. 3, 2019, US.
Dontsova et al., Anionic Polysaccharide Sorption by Clay Minerals, Journal, Soil Science Society of America, Jun. 2, 2005, United States.
Singh et al., Breakdown Products from Perfluorinated Alkyl Substances (PFAS) Degradation in a Plasma-Based Water Treatment Process, Journal, Env. Scie & Tech, Feb. 15, 2019, US.
Dai et al., Comparative study of PFAS treatment by UV, UV/ozone, and fractionations with air and ozonated air, journal, The Royal Society of Chemistry, Sep. 22, 2019, U.S.
Hu et al., Detection of Poly- and Perfluoroalkyl Substances (PFASs) in U.S. Drinking Water Linked to Industrial Sites, journal, Env. Scie & Tech, Aug. 9, 2016, U.S.
Tang. et., Effect of Flux (Transmembrane Pressure) and Membrane Properties on Fouling and Rejection, journal, Env. Eng. & Sci, Stanford, 2007, U.S.
Jeon et al.,Effects of salinity and organic matter on the partitioning of perfluoroalkyl acid, journal, The Royal Society of Chemistry, 2011, United States.
Ateia et al., Efficient PFAS Removal by Amine-Functionalized Sorbents, journal, ACS Publications, Nov. 22, 2019, United States.
Trautmann, et al., Electrochemical degradation of perfluoroalkyland polyfluoroalkyl substances (PFASs) in groundwater, journal, IWA Publishing, 2015, United States.
Smith et al., Environmental fate and effects of poly and perfluoroalkyl substances (PFAS), report, Concawe, Jun. 206, Brussels.
Guelfo et al., Evaluation of a national data set for insights into sources, composition, and concentrations of PFASs, journal, Elsevier, Jan. 19, 2018, United States.
Yu et al., Fate of PFAS during Hydrothermal Liquefaction of Municipal Wastewater Treatment Sludge, journal, Env. Science, Mar. 2, 2020, United States.
De, MDEQ PFAS Sampling Quick Reference Field Guide, catalog, Oct. 17, 2018, Michigan Dept of Env Qual., United States.
Begley et al., Migration of Flurochemical Paper Additives from Food-contact Paper into Foods and Food Stimulants, journal, Taylor and Francis, Jun. 9, 2007, U.S.
Kotthoff et al., Perfluoroalkyl and polyfluoroalkyl substances in consumer products, journal, Springer, Feb. 2, 2015, U.S.
Dixit et al., PFOA and PFOS removal by ion exchange for water reuse and drinking applications, journal, The Royal Society of Chemistry, Sep. 1, 2019, U.S.
Nzeribe et al., Physico-Chemical Processes for the Treatment of PFAS, journal, Taylor and Francis, 2019, U.S.
Sundstrom et al., Radiosynthesis of PFOS and PFBS, journal, Elsevier, Feb. 14, 2012, United States.
Sahu et al., Rapid Degradation and Mineralization of Perfluorooctanoic Acid, journal, ACS Publications, Aug. 2, 2018, United States.
Mccleaf et al., Removal efficiency of multiple PFASs in drinking water, journal, Elsevier, Apr. 26, 2017, United States.
Liu et al., Removal of PFAS from contaminated groundwater, journal, The Royal Society of Chemistry, 2019, United States.
Ochoa-Herrera et al., Removal of perfluorinated surfactants by sorption onto granular activated carbon, zeolite and sludge, journal, Elsevier, Jun. 3, 2008, United States.
Gagliano et al., Removal of PFAS from water by adsorption, journal, Italy.
Zhi et al., Sorption and desorption of anionic, cationic and zwitterionic polyfluoroalkyl substances, journal, Elsevier, Apr. 7, 2018, United States.
Higgins et al., Sorption of Perfluorinated Surfactants on Sediments, journal, American Chemical Society, 2006, United States.
Xiao et al., Sorption of PFASs Relevant to AFFF-Impacted Groundwater, journal, ACS Publications, 2017, United States.
Zhi et al., Surface modification of activated carbon for enhanced adsorption of perfluoroalkyl acids from aqueous solutions, journal, Elsevier, Sep. 28, 2015, U.S.
Ateia et al., The overlooked short- and ultrashort-chain poly- and perfluorinated substances, journal, Elsevier, Dec. 26, 2018, United States.
Appleman et al., Treatment of poly- and perfluoroalkyl substances in U.S. full-scale water treatment systems, journal, Elsevier, Oct. 27, 2013, U.S.
Dept. of Defense, Dod, Doe, Consolidated Quality System Manual for Environmental Laboratories, manual, Dept. of Defense, Sep. 2009, U.S.
Douchand, Interim PFAS Site Guidanc for NAVFAC Remedial Project Managers, memorandum, Sep. 2017, U.S.
Tang et al., Use of Reverse Osmosis Membranes to Remove Perfluorooctane Sulfonate (PFOS) from Semiconductor Wastewater, journal, American Chemical Society, 2006, U.S.
Zaggia et al., Use of strong anion exchange resins for the removal of perfluoroalkylated substances from contaminated drinking water, journal, Elsevier, Nov. 27, 2015, U.S.
Horst et al., Water Treatment Technologies for PFAS: The Next Generation, journal, National Ground Water Association, 2018, U.S.
Backe et al., Zwitterionic, Cationic, and Anionic Fluorinated Chemicals in Aqueous Film Forming Foam Formulations and Groundwater, journal, ACS Publications, 2013, U.S.

\* cited by examiner

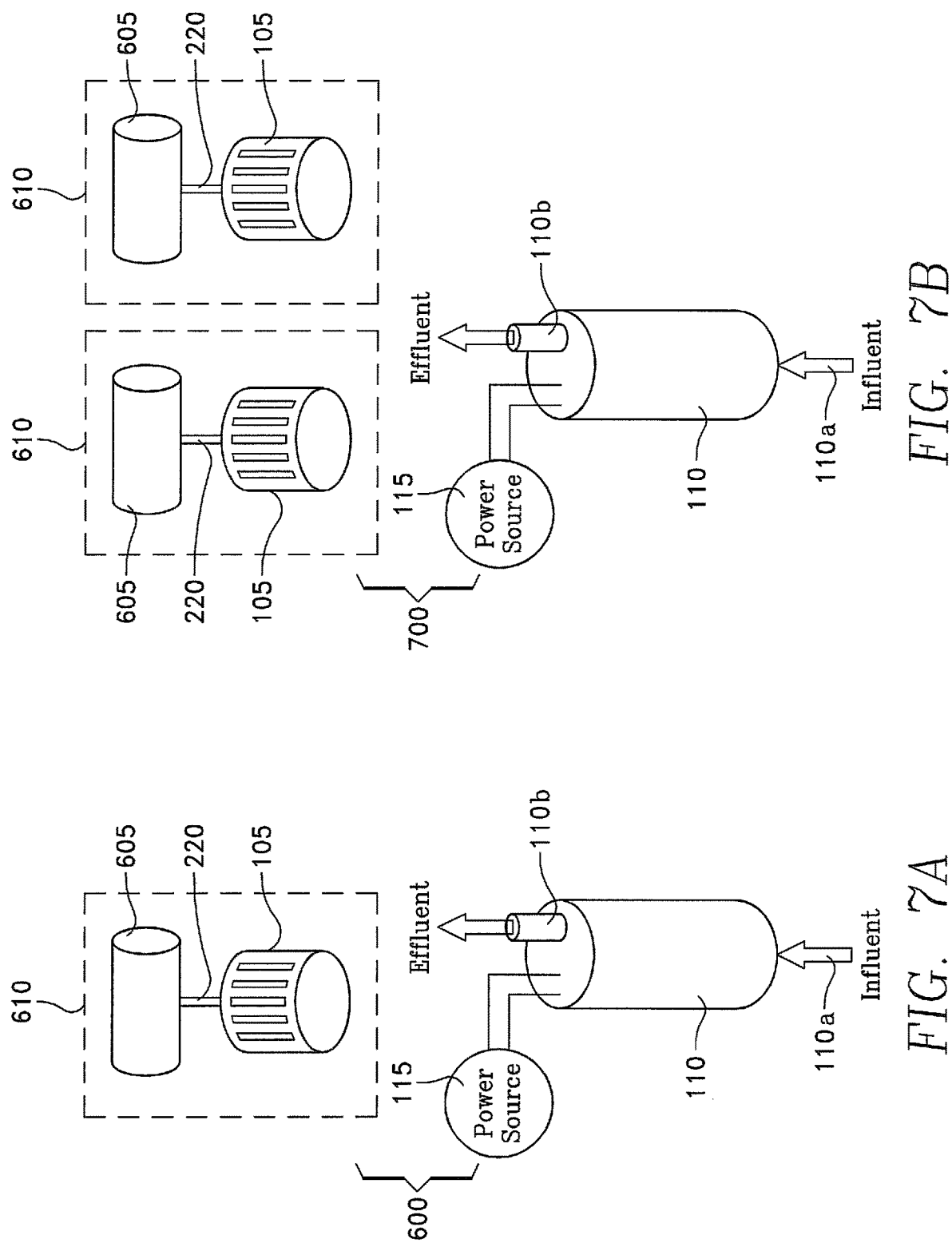

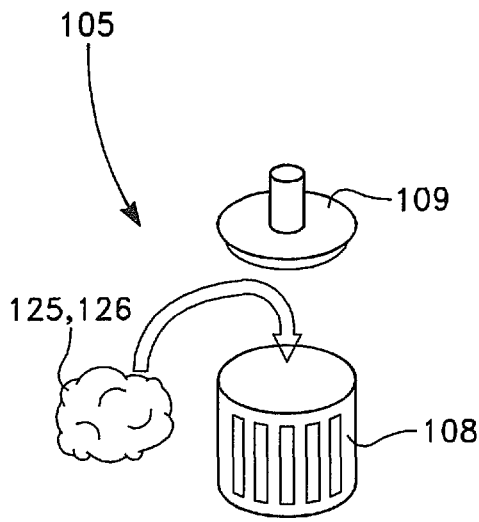
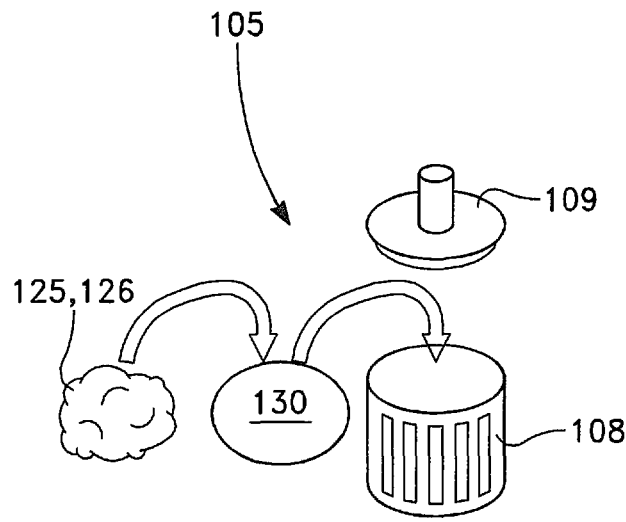
FIG. 8A  FIG. 8B
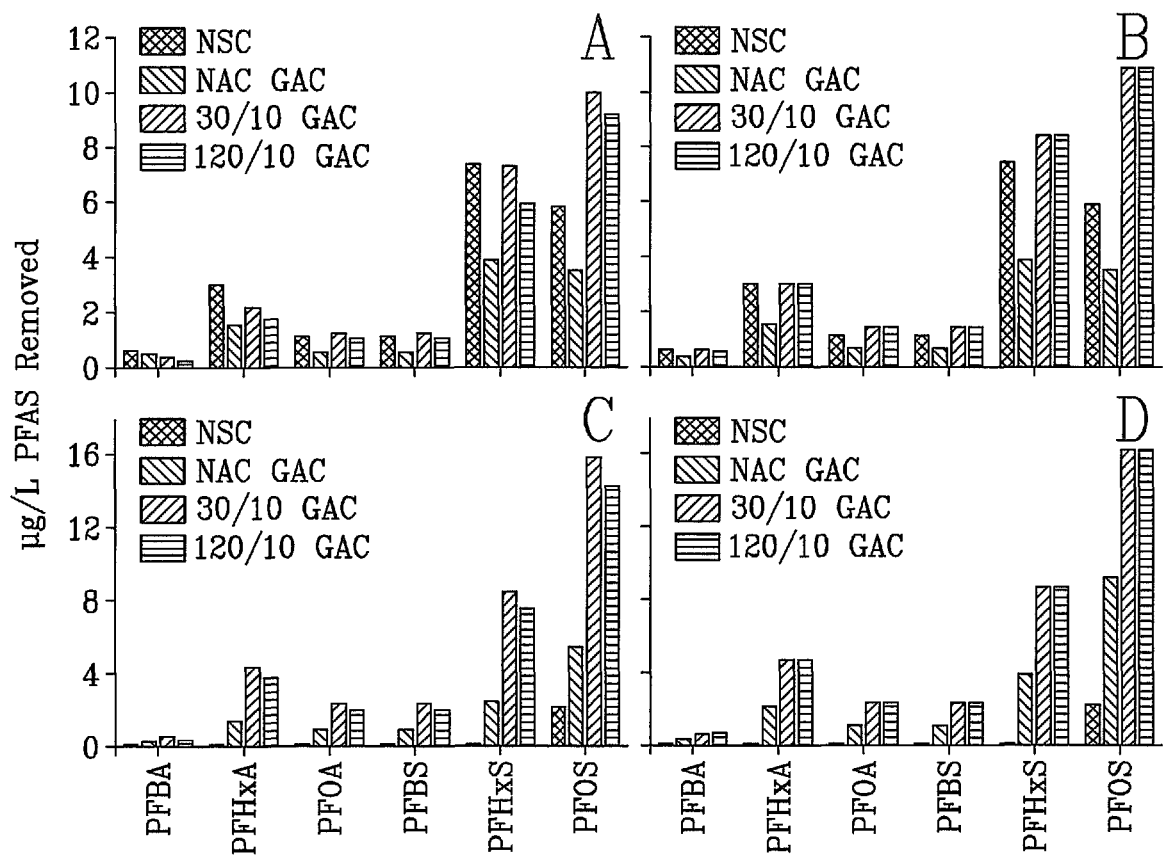
FIG. 9

DROP-IN TREATMENT APPARATUS, SYSTEM, AND METHOD FOR PFAS-IMPACTED LIQUIDS

CROSS-REFERENCE TO RELATED APPLICATIONS

This Application is continuation-in-part patent application of U.S. non-provisional patent application Ser. No. 17/226,543, filed on Apr. 9, 2021, titled "Drop-In Treatment Apparatus and System for PFAS-Impacted Liquids," by co-inventors Jovan Popovic and John Joseph Kornuc, the contents of which are incorporated herein by this reference and to which priority is claimed. U.S. non-provisional patent application Ser. No. 17/226,543 claims the benefit of the commonly owned U.S. provisional patent application No. 63/123,101, titled "Drop-in Treatment System, Method, and Apparatus for Liquids Impacted by Organic and Inorganic Chemicals," filed on Dec. 9, 2020 by co-inventors Jovan Popovic and John Joseph Kornuc, the contents of which are hereby expressly incorporated herein by reference in its entirety and to which priority is claimed.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to systems, methods, and apparatuses for the treatment of liquids containing perfluoroalkyl and polyfluoroalkyl substances (PFAS).

BACKGROUND

PFAS are a class of anthropogenic and recalcitrant fluorocarbon-based chemicals comprising at least approximately 12,000 different compounds. Wide use of PFAS-containing materials has resulted in nearly-ubiquitous global impacts to water and soil. Potential toxic effects of PFAS-containing materials have also led to guidance and regulatory values set by various Federal and State authorities. As a result, this has prompted numerous site investigations to determine the presence, nature, and extent of PFAS at various sites.

Site investigations typically generate both solid and liquid investigation derived waste (IDW) streams. Solid waste streams may include drill cuttings containing PFAS-impacted soil and/or sediment removed for sampling and/or well installations, as well as solid field consumables. PFAS-containing liquid IDW is also generated during well development and subsequent sampling events, and is often co-mingled with small volumes of field decontamination solutions, such as isopropanol and detergent. Hundreds to tens of thousands of gallons of PFAS-containing liquid IDW are derived during these investigations, and current rates of PFAS-laden IDW disposal is roughly $3,000 per 55-gallon drum of liquid via incineration.

Current practices for the disposal of both solid and liquid PFAS-containing IDW generally involve landfill disposal or incineration. There has been increased scrutiny, however, surrounding these options, resulting in a need for alternatives such as on-site treatment of PFAS-containing IDW. In this regard, there is a need to drastically reduce the volume of waste that requires incineration and thus significantly reduce the costs associated with PFAS treatment alone.

SUMMARY OF ILLUSTRATIVE EMBODIMENTS

To minimize the limitations in the related art and other limitations that will become apparent upon reading and understanding the present specification, the following discloses embodiments of new and useful drop-in treatment apparatus, system, and method for PFAS-impacted liquids.

One embodiment may be a drop-in treatment apparatus for PFAS-impacted liquids, comprising: a cartridge having a plurality of openings; a prescribed mass of sorbent disposed within the cartridge and configured to absorb one or more PFAS compounds from a liquid; a submersible pump coupled to the cartridge and having an influent line beneath the submersible pump and an effluent line above the submersible pump; and a power source electrically coupled to the submersible pump. The prescribed mass of sorbent is in the range of approximately 0.1 to 50,000 mg per milliliter of solution. The sorbent may be selected from the group consisting of: pyrogenic carbon, granular activated carbon, biochar, zeolite, and aluminosilicates. The drop-in treatment apparatus may further comprise a mesh container storing the prescribed mass of sorbent, such that the mesh container is disposed within the cartridge. The drop-in treatment apparatus may further comprise a tube; wherein the cartridge may be operably coupled to the effluent line of the submersible pump via the tube, such that the prescribed mass of sorbent may be in fluid communication with the effluent line. The drop-in treatment apparatus may further comprise a tether; wherein the cartridge may be coupled to the submersible pump via the tether, such that when the submersible pump and the cartridge are submerged in the liquid, the cartridge may be above and near the effluent line of the submersible pump. The cartridge may operably couple to an influent line of the submersible pump, such that the prescribed mass of sorbent may be in fluid communication with the influent line. The drop-in treatment apparatus may further comprise a filtration cover substantially covering the cartridge.

Another embodiment may be a drop-in treatment apparatus for PFAS-impacted liquids, comprising: a cartridge having a plurality of openings; a prescribed mass of resin disposed within the cartridge and configured to absorb one or more PFAS compounds from a liquid; a submersible pump coupled to the cartridge and having an influent line beneath the submersible pump and an effluent line above the submersible pump; and a power source electrically coupled to the submersible pump. The prescribed mass of resin may be in the range of approximately 0.1 to 50,000 mg per milliliter of solution and may comprise a polymeric backbone crosslinked with one or more cationic functional groups. The drop-in treatment apparatus may further comprise a mesh container storing the prescribed mass of resin, such that the mesh container is disposed within the cartridge. The drop-in treatment apparatus may further comprise a tube; wherein the cartridge may be operably coupled to the effluent line of the submersible pump via the tube, such that the prescribed mass of resin may be in fluid communication with the effluent line. The drop-in treatment apparatus may further comprise a tether; wherein the cartridge may be coupled to the submersible pump via the tether, such that when the submersible pump and the cartridge are submerged in the liquid, the cartridge may near or above and near the effluent line of the submersible pump. The cartridge may operably couple to an influent line of the submersible pump, such that the prescribed mass of resin may be in fluid communication with the influent line. The drop-in treatment apparatus may further comprise a filtration cover substantially covering the cartridge.

Another embodiment may be a drop-in treatment system for PFAS-impacted liquids, comprising: one or more cartridges, each having a plurality of openings; one or more tethers; one or more buoys; a submersible pump configured to circulate a liquid and having an influent line beneath the submersible pump and an effluent line above the submersible pump; and a power source electrically coupled to the submersible pump; wherein the one or more cartridges may be coupled to the one or more buoys via the one or more tethers, such that when the one or more cartridges are submerged in the liquid, the one or more cartridges may be near a surface of the liquid to absorb one or more PFAS compounds located near the surface. The drop-in treatment apparatus may further comprise one or more mesh containers disposed within the one or more cartridges. The drop-in treatment system may further comprise one or more prescribed masses of sorbent stored within the one or more mesh containers, such that the one or more prescribed masses of sorbent may be disposed within the one or more cartridges; wherein the one or more prescribed masses of sorbent may be configured to absorb the one or more PFAS compounds from the liquid near the surface. The one or more prescribed masses of sorbent may be selected from the group consisting of: pyrogenic carbon, granular activated carbon, biochar, zeolite, and aluminosilicates; and wherein each of the one or more prescribed mass of sorbent may be in the range of approximately 0.1 to 50,000 mg per milliliter of solution. The drop-in treatment system may further comprise one or more prescribed masses of resin stored within the one or more mesh containers, such that the one or more prescribed masses of resin may be disposed within the one or more cartridges; wherein the one or more prescribed masses of resin may be configured to remove the one or more PFAS compounds from the liquid near the surface; and wherein each of the one or more prescribed mass of resin may be in the range of approximately 0.1 to 50,000 mg per milliliter of solution and may comprise a polymeric backbone crosslinked with one or more cationic functional groups.

Another embodiment may be a method for treating PFAS-impacted liquids, the steps comprising: providing a drop-in treatment apparatus, comprising: a prescribed mass of sorbent configured to absorb one or more PFAS compounds from a liquid via sorption, the prescribed mass of sorbent being in a range of approximately 0.1 to 100 mg per milliliter of the one or more PFAS compounds in the liquid; a submersible pump having an influent line disposed at a lower end of the submersible pump and an effluent line disposed at an upper end of the submersible pump; a cartridge having a compartment storing the prescribed mass of sorbent and comprising a plurality of openings, the cartridge being coupled to a downstream end of the effluent line, such that the prescribed mass of sorbent may be in fluid communication with the effluent line of the submersible pump; a mesh container storing the prescribed mass of sorbent, such that the mesh container may be disposed within the cartridge; and a power source electrically coupled to the submersible pump; providing a container and filling the container with the liquid; submerging the drop-in treatment apparatus into the liquid within the drum container, wherein, when the drop-in treatment apparatus is submerged in the liquid and is vertically oriented, the effluent line and the cartridge may be disposed substantially between a surface of the liquid and the influent line of the submersible pump; and activating the submersible pump in order to circulate the liquid within the drum container, such that the liquid may flow through the cartridge and the prescribed mass of sorbent; wherein the prescribed mass of sorbent may absorb the one or more PFAS compounds from the liquid via sorption to create a treated liquid. The method may further comprise the step of: removing the drop-in treatment apparatus from the treated liquid. The method may further comprise the step of disposing the treated liquid. The method may further comprise the step of disposing the cartridge containing the prescribed mass of sorbent. The sorbent may be selected from the group consisting of: pyrogenic carbon, granular activated carbon, biochar, zeolite, and aluminosilicates. The method may further comprise a filtration cover substantially covering the cartridge. The container may be a drum container configured to store up to approximately 55 gallons of the liquid.

Another embodiment may be a method for treating PFAS-impacted liquids, the steps comprising: providing a drop-in treatment apparatus, comprising: a prescribed mass of resin configured to absorb one or more PFAS compounds from a liquid via sorption, the prescribed mass of resin being in a range of approximately 0.1 to 100 mg per milliliter of the one or more PFAS compounds in the liquid and comprising a polymeric backbone crosslinked with one or more cationic functional groups; a submersible pump having an influent line disposed at a lower end of the submersible pump and an effluent line disposed at an upper end of the submersible pump; a cartridge having a compartment storing the prescribed mass of resin and comprising a plurality of openings, the cartridge being coupled to a downstream end of the effluent line, such that the prescribed mass of resin may be in fluid communication with the effluent line of the submersible pump; a mesh container storing the prescribed mass of resin, such that the mesh container may be disposed within the cartridge; and a power source electrically coupled to the submersible pump; providing a container and filling the drum container with the liquid; submerging the drop-in treatment apparatus into the liquid within the container, wherein, when the drop-in treatment apparatus may be submerged in the liquid within the container and may be vertically oriented, the effluent line and the cartridge are disposed substantially between a surface of the liquid and the influent line of the submersible pump; activating the submersible pump in order to circulate the liquid within the container, such that the liquid may flow through the cartridge and the prescribed mass of resin; wherein the prescribed mass of resin may absorb the one or more PFAS compounds from the liquid via sorption to create treated liquid. The method may further comprise the step of: removing the drop-in treatment apparatus from the treated liquid. The method may further comprise the step of disposing the treated liquid. The method may further comprise the step of disposing the cartridge containing the prescribed mass of resin. The method may further comprise a filtration cover substantially covering the cartridge. The container may be a drum container configured to store up to approximately 55 gallons of the liquid.

Another embodiment may be a method for treating PFAS-impacted liquids, the steps comprising: providing a drop-in treatment system, comprising: a prescribed mass of sorbent configured to absorb one or more PFAS compounds from a liquid via sorption, the prescribed mass of sorbent being in a range of approximately 0.1 to 100 mg per milliliter of the one or more PFAS compounds in the liquid; a submersible pump having an influent line disposed at a lower end of the submersible pump and an effluent line disposed at an upper end of the submersible pump; a cartridge having a compartment storing the prescribed mass of sorbent and comprising a plurality of openings; a buoy; a tether coupling the cartridge to the buoy, such that when the cartridge is submerged in the liquid, the cartridge is buoyed near a surface of the liquid to have the prescribed mass of sorbent absorb one or more PFAS compounds from the liquid located near the surface; a power source electrically coupled to the submersible pump; providing a container and filling the container with the liquid; submerging the submersible pump and the cartridge into the liquid within the container and positioning the submersible pump at an elevation below the cartridge; and activating the submersible pump in order to circulate the liquid within the container, such that the liquid may flow through the cartridge and the prescribed mass of sorbent, wherein the prescribed mass of sorbent may absorb the one or more PFAS compounds from the liquid via sorption to create treated liquid. The method may further comprise the step of: removing the submersible pump and the cartridge from the treated liquid. The method may further comprise the step of disposing the treated liquid. The method may further comprise the step of disposing the cartridge containing the prescribed mass of sorbent. The sorbent may be selected from the group consisting of: pyrogenic carbon, granular activated carbon, biochar, zeolite, and aluminosilicates. The method may further comprise a filtration cover substantially covering the cartridge. The container may be a drum container configured to store up to approximately 55 gallons of the liquid.

As PFAS site investigations across the country continue to expand, IDW generation is expected to increase dramatically. PFAS-laden IDW disposal is becoming increasingly problematic as a result of the ever-growing liability associated with accidental re-release (e.g., landfill) of PFAS. Incineration of PFAS impacted liquid IDW is another strategy for disposal, but this approach is time-consuming and prohibitively expensive, especially at large scales.

The embodiments disclosed herein solve this problem by providing an application of a simple, drop-in treatment that utilizes one of two PFAS sorbents: bituminous granular activated carbon (GAC), lignite-derived GAC, or strong base anion exchange resin (IX) and a submersible pump to adsorb and concentrate PFAS mass from liquid IDW.

Bench scale intermittent circulation experiments revealed that bituminous granular activated carbon (GAC, 0.5 mg/mL) removed up to 97.0±1.4% and 96.4±0.5% of perfluorooctanesulfonate (PFOS) and perfluorooctanoate (PFOA), respectively, in both site-derived IDW sources. Improved performance was observed in experimental treatments containing a strong base anion exchange resin (IX, 0.5 mg/mL), where up to 99.4±0.1% and 96.7±0.2% of PFOS and PFOA were removed, respectively. High chloride concentrations (20 g/L) reduced removal of short chain perfluorocarboxylates (PFBA and PFHxA) using GAC or IX, but high salt concentrations had negligible effects on the removal of PFOA, perfluorobutanesulfonate (PFBS), perfluorohexanesulfonate (PFHxS), or PFOS. Excellent scalability was observed in mesoscale experiments, where the majority of amended PFAS mass was removed from synthetic IDW within five days of vessel circulation using two different PFAS-capture configurations. Combined PFOS and PFOA concentrations were reduced to levels below 0.07 μg/L using either GAC or IX for both configurations. Results generated in this study support the application of this approach as an economical strategy for potential waste volume reduction in IDW destined for off-site disposal.

Some of the highlights are as follows:
- A drop-in treatment strategy for PFAS-impacted liquid IDW was developed
- Excellent PFAS removal performance was observed in two site-derived IDW sources
- High chloride (20 g/L) and sulfate (3 g/L) levels had minimal effect on PFAS removal
- Combined PFOS and PFOA levels were reduced to below 0.07 μg/L in mesoscale studies
- Is a low cost and easy to deploy method for liquid IDW management Accordingly, the embodiments disclosed herein are intended to significantly lower the volume of waste, which would normally be disposed of in bulk via incineration, for which incinerating PFAS containing waste currently costs roughly $3,000 per 55 gallon drum. Preliminary data indicate that this approach may reduce disposal costs by 70-fold, in comparison to incineration.

Advantages of the disclosed embodiments over conventional treatment methods:

1.) Only a prescribed amount of sorbent or resin is required to treat the IDW. This will likely result with only a small mass for disposal via incineration and will likely lower operational costs in comparison with conventional systems and methods.
2.) Significantly lower capital costs needed.
3.) Portable and easy to deploy—Unlike conventional systems and methods, which require engineers and/or skilled technicians, the embodiments disclosed herein can simply be dropped into a waste container housing the IDW in order to remove/concentrate PFAS and can be deployed and operated by laborers.
4.) Clogging will not lead to complete shutdown or catastrophic failure of system, as can occur in conventional methods.

Further, should the liquid being treated be co-localized with other chemicals of concern (petroleum hydrocarbons, 1,4-dioxane, hexavalent chromium, chlorinated solvents, nitrate, sulfate, chloride, munitions constituents [RDX, TNT, DNAN, NTO], uranium, iron, manganese, copper, nickel, lead, and zinc), sorbents and resins will likely reduce concentrations of these concurrently with PFAS. The embodiments disclosed herein may also result in significant cost savings due to not having to transport large, heavy volumes of water at 8.3 pounds/gallon (and drum weight). This may reduce carbon footprint and promote a greener approach.

The embodiments disclosed herein are not just limited to PFAS treatment, but may also be used to treat various other chemicals in water commonly found, such as petroleum hydrocarbons, 1,4-dioxane, hexavalent chromium, chlorinated solvents, nitrate, sulfate, chloride, munitions constituents (RDX, TNT, DNAN, NTO), uranium, iron, manganese, copper, nickel, lead, and zinc.

The following are other potential applications of the embodiments:

1.) Treatment of liquid IDW impacted with other chemicals at low levels (petroleum hydrocarbons, 1,4-dioxane, hexavalent chromium, chlorinated solvents, nitrate, sulfate, chloride, munitions constituents [RDX, TNT, DNAN, NTO], uranium, iron, manganese, copper, nickel, lead, etc . . . ).
2.) Treatment option for small quantity waste generators, such as university laboratories 3.) Application to larger scale chemical waste storage tanks (scalable)
4.) Drop in treatment to remove PFAS from impacted raw and/or drinking water tanks
5.) Drop in filtration for swimming pools, ponds, aquariums It is an object to provide a compartmentalized cartridge that may be filled with pyrogenic carbon (inclusive of GAC, biochar, etc.), ion exchange resin, and/or aluminosilicate based sorbents that are capable of removing PFOS, PFOA, PFBA, PFBS, PFPeS, PFPeA, PFHxS, PFHxA, PFHpS, PFHpA, PFNA, 6:2 & 8:2 fluorotelomer sulfonate, simultaneously.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

Some of the drawings are illustrative embodiments of the drop-in treatment apparatus, system, and method for PFAS-impacted liquids. The drawings do not illustrate all embodiments and do not set forth all embodiments. Other embodiments may be used in addition or instead. Details may be omitted to save space or for more effective illustration. Some embodiments may be practiced with additional components or steps and/or without all of the components or steps. When the same numeral appears in different drawings, it is intended to refer to the same or like components or steps.

FIGS. 7A and 7B are illustrations of embodiments of a drop-in treatment system for PFAS-impacted liquid using one or more tethered buoys.

FIGS. 8A and 8B are illustrations of exploded views of the cartridge and show a cartridge without a mesh container and another cartridge with a mesh container, respectively.

FIG. 9 shows the average PFAS removal in the presence and absence of 0.5 mg/mL GAC or IX in Site 1 and Site 2 IDW.

DESCRIPTION OF ILLUSTRATIVE EMBODIMENTS

Figure 1:
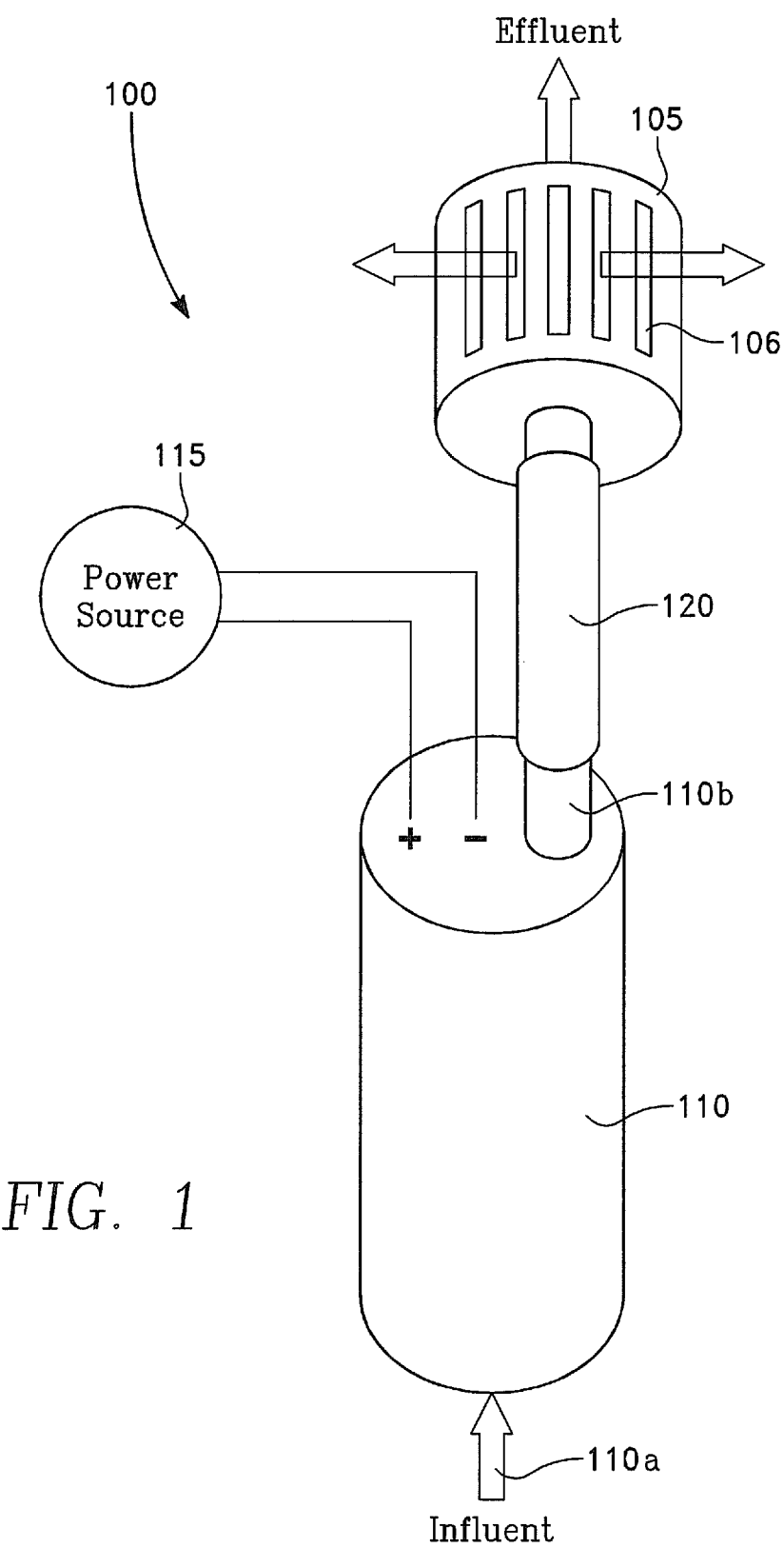
FIG. 1 is an illustration of one embodiment of a drop-in treatment apparatus for PFAS-impacted liquids.

In the following detailed description, numerous specific details are set forth in order to provide a thorough understanding of various aspects of one or more embodiments of the drop-in treatment apparatus, system, and method for PFAS-impacted liquids. However, these embodiments may be practiced without some or all of these specific details. In other instances, well-known methods, procedures, and/or components have not been described in detail, so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for describing particular embodiments only and is not intended to be limiting.

Reference throughout this specification to "one embodiment," "an embodiment," or "another embodiment" may refer to a particular feature, structure, or characteristic described in connection with the embodiments of the present disclosure. Thus, appearances of the phrases "in one embodiment" or "in an embodiment" in various places throughout this specification may not necessarily refer to the same embodiment.

Furthermore, the described features, structures, or characteristics may combine in any suitable manner in various embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of the disclosed embodiments can be practiced without one or more of the specific details, or with other methods, components, materials, etc., In other instances, well-known structures, materials, or operations are generally not shown or described in detail to avoid obscuring aspects of the disclosure.

Definitions

In the following description, certain terminology is used to describe certain features of the embodiments of the drop-in treatment apparatus, system, and method for PFAS-impacted liquids in accordance with the present disclosure. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of 10% of a specific value. For example, the expression "approximately 150 inches" may comprise the values of 150 inches ±10%, i.e. the values from 135 inches to 165 inches.

As used herein, the term "about" is used to provide flexibility to a numerical range endpoint by providing that a given value may be "a little above" or "a little below" the endpoint. In some cases, the term "about" is to include a range of not more than about two inches of deviation.

As used herein, the terms "PFAS," "PFAS compound," and "PFAS-substance" are a group of man-made chemicals within the per- and polyfluoroalkyl substances group, and may include, without limitation, PFOS, PFOA, PFBA, PFBS, PFPeS, PFPeA, PFHxS, PFHxA, PFHpS, PFHpA, PFNA, 6:2 and 8:2 fluorotelomer sulfonates, and combinations thereof.

As used herein, the term "cationic functional group" refers to positively charged polyatomic ions, and may include, without limitation, quaternary ammonium, pyridinium ion, guanidinium ion, imidazolium ion, phosphonium ion, and sulfonium ion.

As used herein, the term "prescribed mass" generally refers to a recommended amount of mass of sorbent or resin (including ion exchange resins) used based on the amount of liquid to be treated. In various embodiments, the prescribed mass may be in the range of 0.1-50,000 milligrams per milliliter of liquid volume to be treated.

As used herein in the present disclosure, the singular forms "a" and "the" may include plural referents, unless the context clearly dictates otherwise. Thus, for example, reference to an "opening" can include reference to one or more of such openings.

Numerous locations have been impacted by PFAS due to the use, storage, and treatment of PFAS-containing materials such as aqueous film-forming foam (AFFF), electroplating mist suppressants, and wastewater. Soil, sediment, groundwater and surface water may have been impacted at these sites, but the most immediate concern is groundwater used as a drinking water source, because this route presents the greatest exposure risk.

Recently, the Environmental Protection Agency (EPA) announced the proposed National Primary Drinking Water Regulation (NPDWR) for six PFAS, including: perfluorooctanoic acid (PFOA), perfluorooctane sulfonic acid (PFOS), perfluorononanoic acid (PFNA), hexafluoropropylene oxide dimer acid (HFPO-DA, commonly known as GenX Chemicals), perfluorohexane sulfonic acid (PFHxS), and perfluorobutane sulfonic acid (PFBS). PFOS and PFOA each have a proposed maximum contaminant level (MCL) of 4.0 ng/L, while the other four PFAS have a combined maximum contaminant level calculated as a unitlesss hazard quotient of 1.0. The EPA also previously issued lifetime health advisory levels for PFOA and PFOS to 70 parts per trillion (ppt, nanograms/liter), though this advisory will be superseded by the maximum contaminant level after a period of public comment and review. In addition, regulators in some states have established their own PFAS regulatory values, some of which are on the same order of stringency as the proposed EPA MCLs. These low regulatory values will require the development of rigorous treatment methods for groundwater and IDW alike.

During PFAS site investigations, PFAS-containing liquid IDW is generated during monitoring well installation and development, disposal of residual sampling liquids, and disposal of decontamination solutions. This waste is usually drummed up and stored on-site until disposal.

The embodiments disclosed herein solve this problem by providing embodiments of a novel drop-in treatment approach for PFAS removal in containerized liquid IDW in order to reduce the volume of PFAS-impacted waste requiring off-site disposal by concentrating PFAS onto various sorbents. Bituminous granular activated carbon (GAC) or strong base anion exchange resin (IX) may be placed in permeable container such as a mesh bag, and a small submersible pump may provide circulation of water to increase contact with sorbents thereby reducing treatment time. A low prescribed mass of sorbent (e.g., GAC) or resin (e.g., IX) adapted to remove PFAS from aqueous solutions presents an opportunity for their use in an easy-to-deploy treatment process that may allow for easier operation and mobilization costs.

The embodiments disclosed herein may also utilize a cartridge having a plurality of openings and filled with the prescribed mass of sorbent or resin. The cartridge may be constructed of various materials, including without limitation, high density polyethylene (HDPE), low density polyethylene (LDPE), polyethylene terephthalate (PETE), polypropylene (PP), polystyrene (PS), poly(methyl methacrylate), nylon polycarbonate, polyvinyl chloride (PVC), or stainless steel (316, 304). The prescribed mass of sorbent may also be pyrogenic carbon (e.g. GAC, biochar) zeolite, or aluminosilicates). The resin may be capable of removing PFAS compounds such as PFOS, PFOA, PFBA, PFBS, PFPeS, PFPeA, PFHxS, PFHxA, PFHpS, PFHpA, PFNA, 6:2 & 8:2 fluorotelomer sulfonates from liquid.

The prescribed mass of sorbent or resin added to each cartridge may be in the range of 0.1-50,000 milligrams per milliliter of liquid volume to be treated. This prescribed mass may also be added to a mesh container prior to being added to the cartridge. Alternatively, the prescribed mass may be added to the cartridge without the mesh container.

In various embodiments, the cartridge may comprise openings and may be assembled from two pieces, an upper cartridge housing and a bottom cartridge housing. In some embodiments, the upper cartridge housing may comprise a nipple adapted to engage a tube. The bottom cartridge housing may comprise additional openings. The upper cartridge housing and bottom cartridge housing may attach to each other using various fastening mechanisms. Examples of fastening mechanisms may include, without limitation, threaded fastener (pre-threaded), snap fasteners, sonic welding, adhesive, or the like. The cartridge may then couple to a submersible pump using various embodiments:
1) The cartridge coupled to the effluent line of the submersible pump via a tube.
2) A single cartridge floating above and tethered to the submersible pump.
3) A plurality of cartridges floating above and tethered to the submersible pump.
4) The cartridge coupled to the influent line of the submersible pump and having a filtration covering.

5) The cartridge coupled to the influent line of the submersible pump without a filtration covering.

Once a cartridge filled with sorbent and/or resin and having a plurality of openings is coupled to the submersible pump, the submersible pump and cartridge can both be submerged into a liquid that may or may not be impacted with PFAS compounds. A power source may be electrically coupled to the submersible pump to provide power and begin agitating the PFAS-impacted liquid. This in turn may subsequently increase mass transfer from bulk of the liquid to the sorbent or resin contained within the cartridge, thereby decreasing treatment time in removing PFAS from the liquid. The submersible pump may be powered constantly or intermittently to achieve sufficient chemical mass transfer of PFAS from the liquid to the sorbent or resin.

Once treatment is complete, the cartridge and submersible pump may be removed from the liquid, and the cartridge may be disposed of according to specific environmental regulations.

FIG. 1 is an illustration of one embodiment of a drop-in treatment apparatus 100 for PFAS-impacted liquids. As shown in FIG. 1, one embodiment of a drop-in treatment apparatus 100 may utilize a flow through configuration and may comprise: a cartridge 105, submersible pump 110, power source 115, and tube 120. Additionally, the cartridge 105 may further include a prescribed mass of sorbent 125 (shown in FIGS. 8A and 8B) or resin 126 (shown in FIGS. 8A and 8B) and a mesh container 130 (shown in FIG. 8B), wherein the mesh container 130 may be disposed within the cartridge 105 and store the sorbent 125 or resin 126.

The cartridge 105 may contain or hold a prescribed mass of sorbent 125 or resin 126, both of which are preferably capable of absorbing one or more PFAS compounds from a liquid. The cartridge 105 preferably comprises openings 106 to allow liquid to travel through the cartridge 105.

Importantly, the cartridge 105 may be configured to couple to the submersible pump 110 via the tube 120. In an exemplary embodiment, the tube 120 may physically couple the cartridge 105 to the effluent line 110b of the submersible pump 110, such that the sorbent 125 or resin 126 may be in fluid communication with the effluent line 110b.

The submersible pump 110 may be device that moves or transfers fluids from an influent line 110a to an effluent line 110b of the submersible pump 110 via mechanical action and may be electrically powered by the power source 115. Thus, when submerged into a container of liquid, the submersible pump 110 may circulate the liquid within the container. In an exemplary embodiment, the influent line 110a may be disposed beneath the submersible pump 110 and the effluent line 110b may be positioned above the submersible pump 110, such that fluid located beneath the submersible pump 110 may be pumped into the influent line 110a and exit above the submersible pump 110 via the effluent line 110b. In this manner, fluid pumped into the submersible pump 110 may travel into the cartridge 105 and into contact with the sorbent 125 or resin 126. Although FIG. 1 shows the influent line 110a located beneath the submersible pump 110 and the effluent line 110b located above the submersible pump 110, other embodiments of the submersible pump may have the influent line 110a and effluent line 110b located at other areas such as the lateral sides of the submersible pump.

As recited above, one embodiment of the prescribed mass stored within the cartridge 105 may be a sorbent 125. The sorbent 125 may be a substance adapted to collect PFAS from other substances by sorption and may include, without limitation, pyrogenic carbon, granular activated carbon, lignite-derived granular activated carbon, biochar, zeolite, and aluminosilicates. In an exemplary embodiment, the sorbent 125 may be bituminous granular activated carbon (GAC) and may be in the range of approximately 0.1 to 50,000 mg per milliliter of solution. GAC generally possesses favorable properties for PFAS treatment applications, including surface functional group heterogeneity and vast microporous regions, which provide a variety of removal mechanisms for liquid contaminants. Further, GAC helps maintain its performance across a broad range of water chemistries, including those associated with saline environments. GAC generally has a higher affinity for long chain PFAS compounds such as perfluorooctanesulfonate (PFOS), perfluorooctanoate (PFOA), and perfluorononanoate (PFNA), but displays a decreasing affinity for shorter chain PFAS. GAC also generally displays a lower affinity for perfluorocarboxylates versus the corresponding number perfluorosulfonates. Alternative sorbents 125 may be used in place of or in conjunction with GAC to address these limitations.

Similarly, in an alternative embodiment, the prescribed mass stored within the cartridge 105 may be a resin 126. Like the sorbent 125, the resin 126 may be a solid or highly viscous substance configured to remove PFAS. In an exemplary embodiment, the resin 126 may be an anion exchange resin (IX), which has emerged as another viable technology for the treatment of PFAS-impacted liquid waste streams. IX generally possesses high binding capacity, smaller process footprint in comparison to GAC, and in certain cases, regenerability. PFAS removal in the presence of ion exchange resins can also be attributed to both counterion exchange or sorption to a resin's polymeric backbone via hydrophobic interactions. PFAS treatment applications using IX typically use strong base anion exchange resins that are decorated with positively charged amine functional groups, as these tend to have enhanced performance with respect to reduction of anionic PFAS mass. Considering that PFAS exists as anionic, cationic, or zwitterionic compounds in the environment, variations in molecular charge may affect IX removal performance, depending on the type of resin used. The prescribed mass of IX 126 may be in the range of approximately 0.1 to 50,000 mg per milliliter of solution.

Cations are preferably single atoms or molecules possessing a net positive charge resulting from electron loss. These positively charged ions can participate in cation-anion interactions with negatively charged atoms and molecules through electrostatic attraction. With respect to polyatomic cations, these are a group of atoms, which generally contain a net positive molecular charge and can interact with a host of mono- and polyatomic anions. Thus, in water treatment applications, polyatomic cation-containing material may remove various negatively charged chemicals or elements from solution, and in the context of PFAS treatment, anionic PFAS, which contain a net negative molecular charge, may be removed from solution via electrostatic interactions with these materials.

Figure 2:
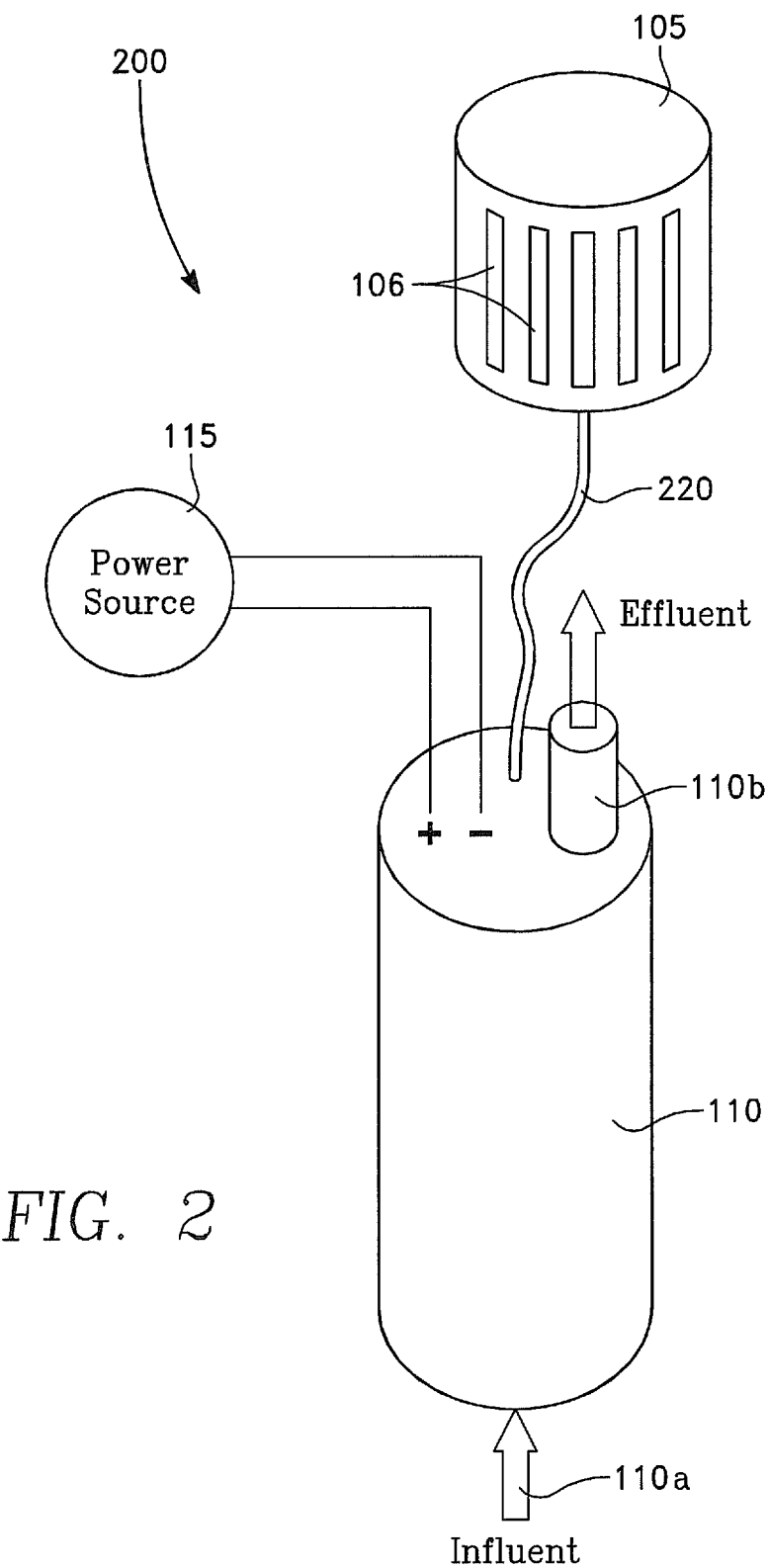
FIG. 2 is an illustration of another embodiment of a drop-in treatment apparatus for PFAS-impacted liquids.

FIG. 2 is an illustration of another embodiment of the drop-in treatment apparatus 200 for PFAS-impacted liquids. As shown in FIG. 2, another embodiment of the drop-in treatment apparatus 200 may comprise: a cartridge 105, submersible pump 110, power source 115, and tether 220. The cartridge 105 may further comprise a prescribed mass of sorbent 125 or resin 126. Unlike the embodiment in FIG. 1, which utilizes a flow through configuration, another embodiment of the drop-in treatment apparatus 200 may operate using a floating configuration.

As recited above, the cartridge 105 may contain, store, or hold a prescribed mass of sorbent 125 or resin 126 for absorbing or removing one or more PFAS compounds from PFAS-impacted liquid to be treated. The cartridge 105 preferably comprises openings 106 to allow liquid to travel the cartridge 105. Unlike the previous embodiment above, the cartridge 105 may couple to the submersible pump 110 via a tether 220. In particular, the tether 220 may physically couple the cartridge 105 to the top portion of the submersible pump 110, such that when the submersible pump 110 and the cartridge 105 are submerged in the liquid, the cartridge 105 may float above and near the effluent line 110b of the submersible pump 110. In this manner, the fluid being circulated by the submersible pump 110 may come into contact with the prescribed mass of sorbent 125 or resin 126 more efficiently.

Like the previous embodiment, the submersible pump 110 may circulate PFAS-impacted liquid within a container by moving or transferring the liquid from the influent line 110a to the effluent line 110b and may be electrically powered by the power source 115. Additionally, the sorbent 125 or resin 126 (e.g., GAC, IX) may absorb PFAS substances from the liquid and are preferably in the range of approximately 0.1 to 50,000 mg per milliliter of solution.

Figure 3:
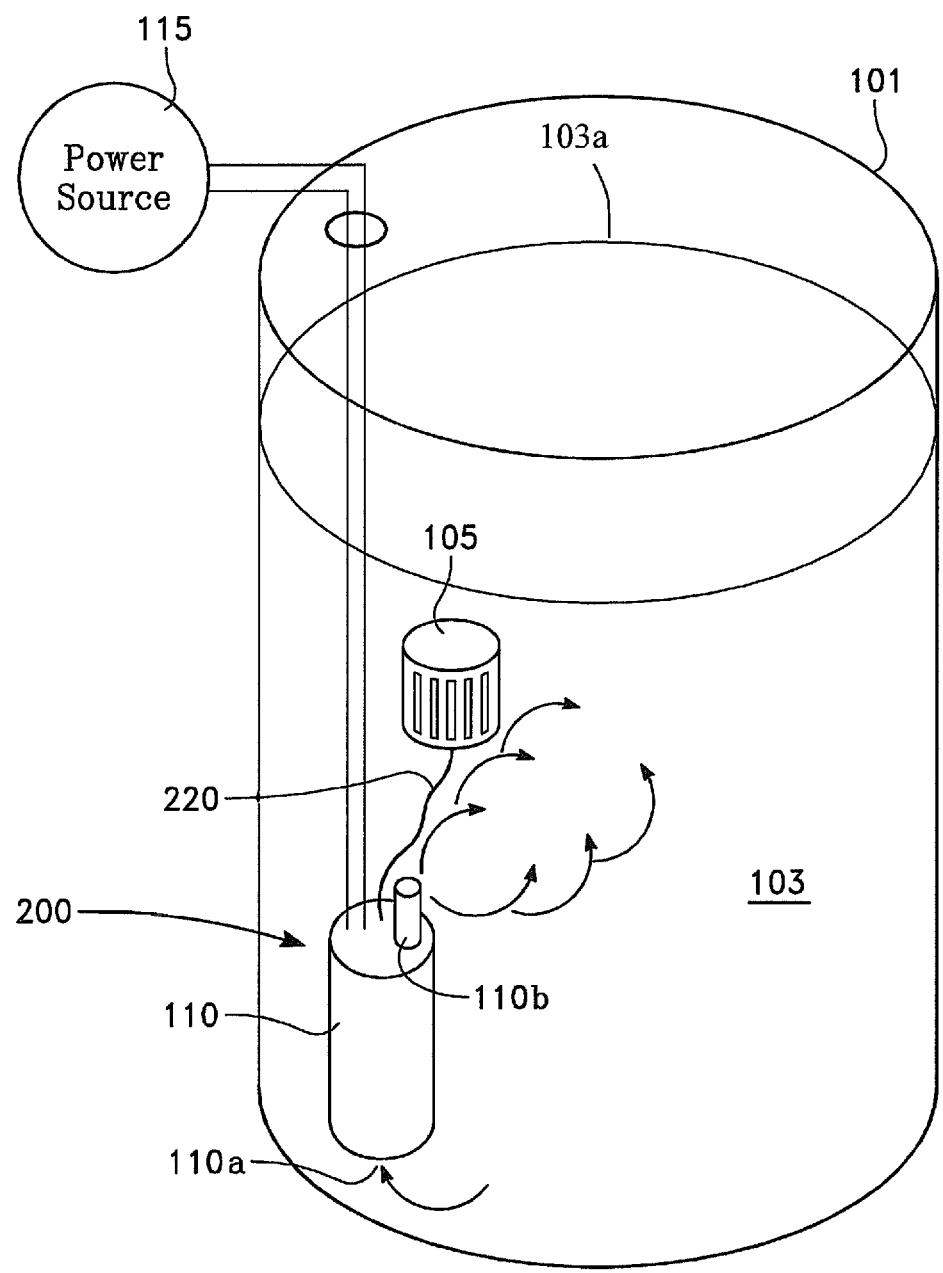
FIG. 3 is an illustration of another embodiment of the drop-in treatment apparatus treating PFAS-impacted liquid inside a container.

FIG. 3 is an illustration of another embodiment of the drop-in treatment apparatus 200 treating PFAS-impacted liquid 103 inside a container 101. As shown in FIG. 3, another embodiment of the drop-in treatment apparatus 200 may be substantially submerged in a container 101 filled with PFAS-impacted liquid 103 and may comprise: a cartridge 105, submersible pump 110, power source 115, and tether 220.

FIG. 3 shows that the submersible pump 110 and cartridge 105 containing the prescribed mass of sorbent 125 or resin 126 may be initially lowered into the container 101 (e.g., drum container). The submersible pump 110 may then be activated and powered by the power source 115 in order to circulate the PFAS-impacted liquid 103 within the container 101. As the PFAS-impacted liquid 103 circulates in the container 101, the PFAS-impacted liquid 103 may make contact with the prescribed mass or sorbent 125 or resin 126 within the cartridge 105. In doing so, the PFAS components within the liquid 103 is preferably transferred from the PFAS-impacted liquid 103 to the sorbent 125 or resin 126, thereby removing the PFAS substances from the liquid and concentrating the PFAS substances to the sorbent 125 or resin 126. As a result, the treated liquid may be disposed of whilst the cartridge 105 with the sorbent 125 or resin 126 containing the PFAS substances can undergo solid waste disposal processing.

Importantly, FIG. 3 shows an embodiment of the drop-in treatment apparatus 200 being vertically oriented. Specifically, the drop-in treatment apparatus 200 may be vertically oriented when the effluent line 110b and cartridge 105 of the drop-in treatment apparatus 200 are disposed substantially between a surface 103a of the liquid 103 and an influent line 110a of the submersible pump 110. That way, fluid located beneath the submersible pump 110 may be pumped into the influent line 110a and exit above the submersible pump 110 via the effluent line 110b. In this manner, fluid or liquid 103 pumped into the submersible pump 110 may travel into the cartridge 105 and into contact with the sorbent 125 or resin 126. Because the cartridge 105 and effluent line 110b of the submersible pump 110 are near or towards the surface 103a of the liquid 103, prescribed masses of sorbent 125 or resin 126 may reduce the amount of PFAS concentrated near the surface 103a of the liquid 103 in the container 101 or drum container.

Figure 4:
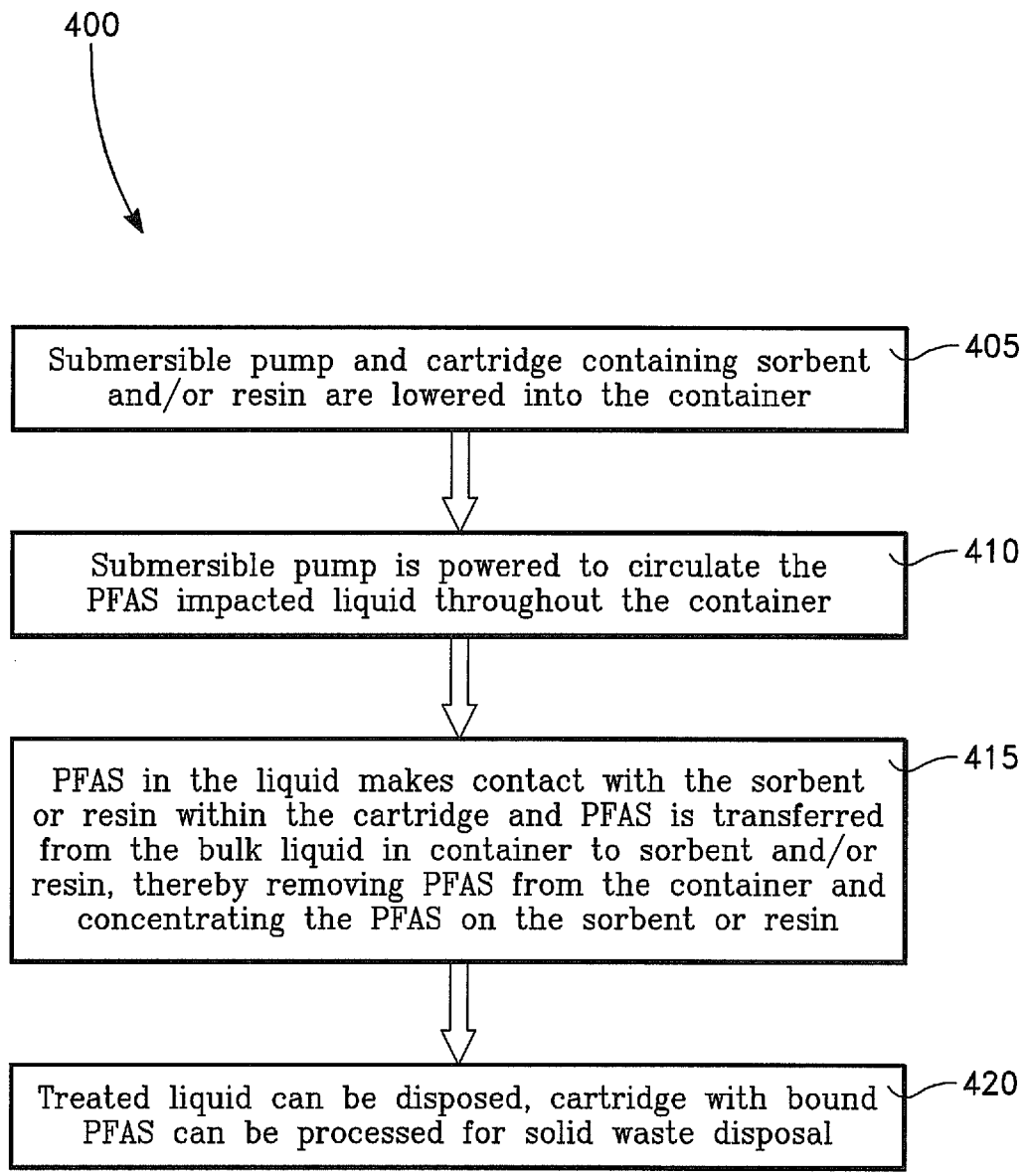
FIG. 4 is a flow chart of one embodiment of a method for treating PFAS-impacted liquids using a drop-in treatment apparatus.

FIG. 4 is a flow chart of one embodiment of a method 400 for treating PFAS-impacted liquids 103 using a drop-in treatment apparatus 100, 200. As shown in FIG. 4, one embodiment of a method 400 for treating PFAS-impacted liquids 103 using the drop-in treatment apparatus 100, 200 may comprise steps 405, 410, 415, 420. Specifically, FIG. 4 shows step 405, which is lowering the submersible pump 110 and cartridge 105 of the drop-in treatment apparatus 100, 200 into the container 101 containing PFAS-impacted liquid 103. Here, while being electrically coupled to the power source 115, the submersible pump 110 and cartridge 105 containing the sorbent 125 or resin 126 may be lowered into the liquid 103. Once submerged, the submersible pump 110 may be activated or powered, as shown in step 410. As a result, the PFAS-impacted liquid 103 may circulate throughout the container and thus allow the PFAS to flow through the cartridge 105 via the openings 106. In this manner, PFAS may make contact with the sorbent 125 or resin 126 stored therein, thereby transferring from the liquid in the container 101 to the sorbent 125 or resin 126, as shown in step 415. In this manner, the sorbent 125 or resin 126 preferably binds with the PFAS within the liquid 103 via sorption.

Finally, in step 420, the treated liquid 103 may be disposed. Given that a majority of the PFAS is bound to the sorbent 125 or resin 126, the PFAS may be removed by simply disposing the cartridge 125. As such, the drop-in treatment apparatus 100, 200 and method 400 allows for easier processing of solid waste disposal.

Figures 5A, 5B, 5C:
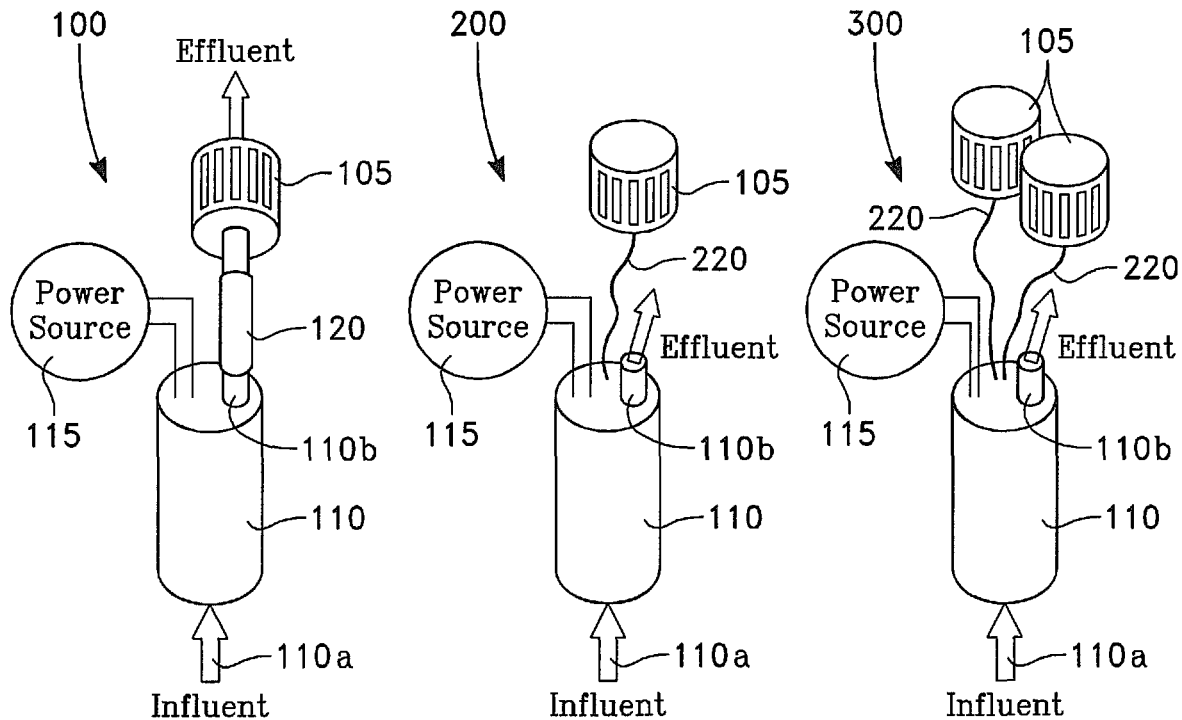
FIGS. 5A to 5E are illustrations of various embodiments of the drop-in treatment apparatus for PFAS-impacted liquids.

FIGS. 5A to 5E are illustrations of various embodiments of the drop-in treatment apparatus 100, 200, 300, 400, 500 for PFAS-impacted liquids. Specifically, as shown and described in FIG. 1, FIG. 5A illustrates a first embodiment of the drop-in treatment apparatus 100, which utilizes a flow through configuration. As shown, this first embodiment of the drop-in treatment apparatus 100 may comprise: a cartridge 105, submersible pump 110, power source 115, and tube 120, wherein the cartridge 105 may further comprise openings 106, a mesh container 130, and a prescribed mass of sorbent 125 or resin 126 stored therein. The mesh container 130 and sorbent 125 and/or resin 126 may both be disposed within the cartridge 105. Further, the cartridge 105 may be directly coupled to the effluent line 110b of the submersible pump 110, such that the sorbent 125 or resin 126 may be in fluid communication with the effluent line 110b.

Notably, when submerged into a container of PFAS-impacted liquid 103, the submersible pump 110 may circulate the liquid 103 within the container 101. In particular, liquid 103 located beneath the submersible pump 110 may be pumped into the influent line 110a and may exit out the effluent line 110b, such that the liquid 103 pumped into the submersible pump 110 may travel into the cartridge 105 and contact the sorbent 125 or resin 126.

Turning to FIG. 5B, a second embodiment of the drop-in treatment apparatus 200 (similar to FIG. 2) may utilize a floating configuration. In this embodiment, the second embodiment of the drop-in treatment apparatus 200 may comprise: a cartridge 105, submersible pump 110, power source 115, and tether 220, wherein the cartridge 105 may comprise openings 106 and further store a prescribed mass of sorbent 125 or resin 126. Notably, the cartridge 105 may couple to the top portion of the submersible pump 110, such that when the submersible pump 110 and cartridge 105 are submerged within PFAS-impacted liquid 103, the cartridge 105 may float above and near the effluent line 110b of the submersible pump 110. In this manner, the PFAS-impacted liquid 103 being circulated by the submersible pump 110 may come into contact with the sorbent 125 or resin 126.

FIG. 5C illustrates a third embodiment of the drop-in treatment apparatus 300, comprising: cartridges 105, a submersible pump 110, power source 115, and tethers 220, wherein each cartridge 105 may further comprise openings 106 and a prescribed mass of sorbent 125 or resin 126. Unlike the first and second embodiments, the third embodiment of the drop-in treatment apparatus 300 may utilize a floating configuration with multiple floating cartridges 105 coupled to a single submersible pump 110 via multiple tethers 220. In this manner, PFAS-impacted liquid 103 may be treated more quickly with multiple sorbents 125 or resin 126 when the PFAS-impacted liquid 103 is circulated by the submersible pump 110.

Figures 5D, 5E:
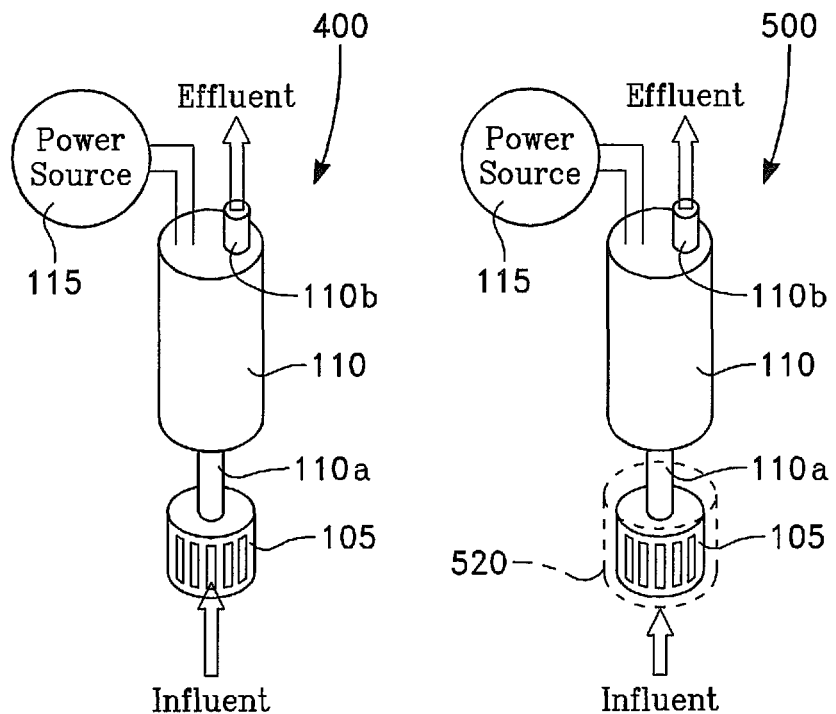

Referring to FIG. 5D, a fourth embodiment of the drop-in treatment apparatus 400 may also utilize a flow through configuration and may comprise: a cartridge 105, submersible pump 110, and power source 115, wherein the cartridge 105 may further comprise a prescribed mass of sorbent 125 or resin 126 and a mesh container 130. Unlike the first embodiment shown in FIG. 5A, the cartridge 105 of the fourth embodiment is preferably coupled to the influent line 110a of the submersible pump 110 rather than the effluent line 110b. In this manner, the sorbent 125 or resin 126 may be in fluid communication with the influent line 110a. Thus, when the submersible pump 110 is submerged into a container of PFAS-impacted liquid 103 to be treated, liquid 103 pumped into the submersible pump 110 may first travel into the cartridge 105 and come into contact with the resin 126 or sorbent 125. As a result, PFAS-impacted liquid 103 pumped into the submersible pump 110 may first be treated before exiting out the effluent line 110b.

Finally, FIG. 5E illustrates a fifth embodiment of the drop-in treatment apparatus 500, comprising: a cartridge 105, submersible pump 110, and power source 115, wherein the cartridge 105 may further comprise a prescribed mass of sorbent 125 or resin 126 and a mesh container 130. In this embodiment, the drop-in treatment apparatus 500 may utilize a flow through configuration with the cartridge 105 coupled to the influent line 110a of the submersible pump 110. Unlike the fourth embodiment above, the fifth embodiment of the drop-in treatment apparatus 500 may utilize a filtration cover 520 substantially covering the cartridge 105. In this manner, fluid pumped into the submersible pump 110 may first filter out larger particles before entering the cartridge 105 and coming into contact with the prescribed mass 125 of resin 126 or sorbent 125.

Figure 6C:
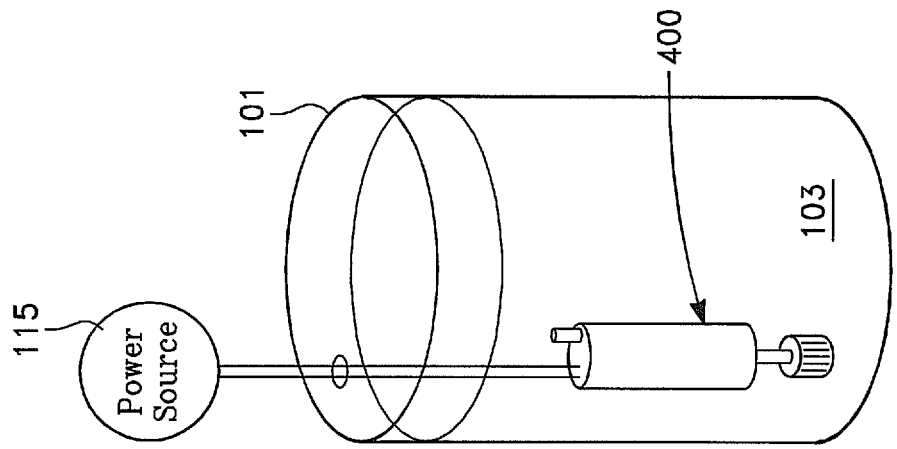
FIGS. 6A to 6C are illustrations of various embodiments of the drop-in treatment apparatus and shows how each embodiment treats PFAS-impacted liquid inside a container.
Figure 6B:
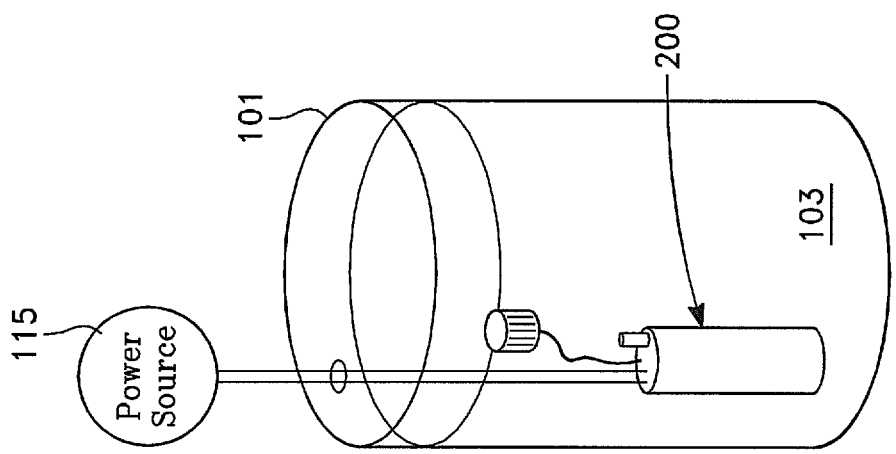
Figure 6A:
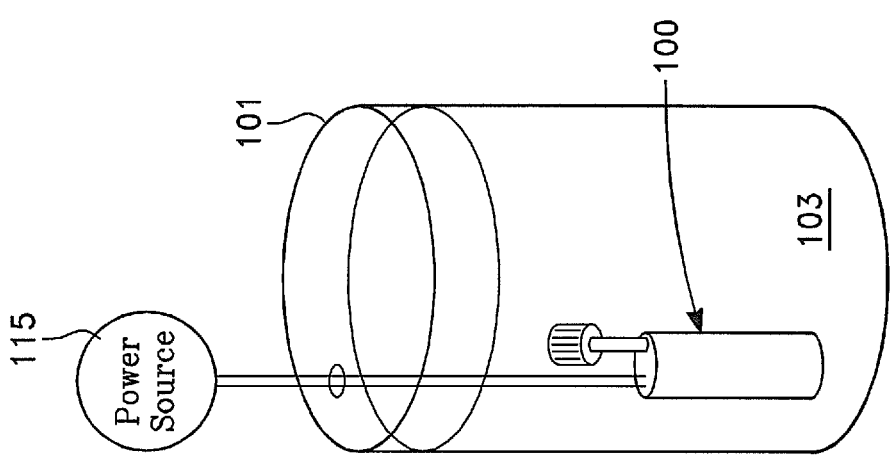

FIGS. 6A to 6C are illustrations of various embodiments of the drop-in treatment apparatus 200 and shows how each embodiment treats PFAS-impacted liquid 103 inside a container 101. In particular, FIG. 6A shows an embodiment of the drop-in treatment apparatus 100 using the flow through configuration. Here, while submerged in the liquid 103 to be treated, the cartridge 105 may be directly coupled to the effluent line 110b of the submersible pump 110, such that the sorbent 125 or resin 126 may be in fluid communication with the effluent line 110b. In this manner, as the submersible pump 110 circulates the PFAS-impacted liquid 103 within the container 101, the liquid 103 located beneath the submersible pump 110 may be pumped into the influent line 110a and may exit out the effluent line 110b, directly into the cartridge 105 and into contact with the sorbent 125 or resin 126.

FIG. 6B depicts another embodiment of the drop-in treatment apparatus 200 using the floating configuration. Here, while submerged in the liquid 103 to be treated, the cartridge 105 may be coupled to the top portion of the submersible pump 110 via a tether 220. In this manner, when the submersible pump 110 and the cartridge 105 are submerged in the liquid 103, the cartridge 105 may float above and near the effluent line 110b of the submersible pump 110 in order for the liquid 103 being circulated from the effluent line 110b to come into contact with the prescribed mass of sorbent 125 or resin 126.

Finally, FIG. 6C shows another embodiment of the drop-in treatment apparatus 400 using a flow through configuration. Here, unlike the first embodiment shown if FIG. 6A, the cartridge 105 may be coupled directly to the influent line 110a of the submersible pump 110 rather than the effluent line 110b. In this manner, as the submersible pump 110 circulates the liquid 103 to be treated, liquid 103 pumped into the submersible pump 110 may first travel into the cartridge 105 and into contact with the resin 126 or sorbent 125. As a result, PFAS-impacted liquid 103 entering the submersible pump 110 may first be treated before exiting out the effluent line 110b.

Importantly, FIGS. 6A to 6C show embodiments of the drop-in treatment apparatus 100, 200, 400 being vertically oriented. Specifically, embodiments of the drop-in treatment apparatus 100, 200, 400 may be vertically oriented when the effluent line 110b and cartridge 105 of the drop-in treatment apparatus 100, 200, 400 are disposed substantially between a surface 103a of the liquid 103 and an influent line 110a of the submersible pump 110. That way, fluid located beneath the submersible pump 110 may be pumped into the influent line 110a and exit above the submersible pump 110 via the effluent line 110b. In this manner, fluid or liquid 103 pumped into the submersible pump 110 may travel into the cartridge 105 and into contact with the sorbent 125 or resin 126. Because the cartridge 105 and effluent line 110b of the submersible pump 110 are near or towards the surface 103a of the liquid 103, prescribed masses of sorbent 125 or resin 126 may reduce the amount of PFAS concentrated near the surface 103a of the liquid 103 in the drum container 101.

FIGS. 7A and 7B are illustrations of embodiments of a drop-in treatment system 600, 700 for PFAS-impacted liquid using one or more tethered buoys 610. As shown in FIGS. 7A and 7B, additional embodiments of the drop-in treatment apparatus 600, 700 may comprise: one or more cartridges 105, a submersible pump 110, a power source 115, one or more tethers 220, and one or more buoys 605. Each cartridge 105 may also further comprise a prescribed mass of sorbent 125 or resin 126. Unlike the previous embodiments, additional embodiments of the drop-in treatment apparatus 600, 700 may utilize a tethered buoy 610.

Specifically, like the previous embodiments, each cartridge 105 may contain, store, or hold a prescribed mass of sorbent 125 or resin 126 (e.g., GAC, IX) for absorbing or removing one or more PFAS compounds from PFAS-impacted liquid 103 to be treated. Additionally, each cartridge 105 preferably comprises openings 106 to allow liquid 103 to travel through the cartridge 105.

Unlike some of the previous embodiments where the cartridge 105 is tethered to the submersible pump 110, FIGS. 7A and 7B show that the cartridge 105 may couple to a buoy 605 via a tether 220. Thus, when the submersible pump 110 and cartridge(s) 105 are submerged in the liquid, the buoy(s) 605 may buoy the cartridge(s) 105 near the surface of the liquid 103 and preferably at a higher position than the submersible pump 110. In other embodiments, the cartridge (s) 105 itself/themselves may float near the surface of the liquid 103. In this manner, as the submersible pump 110 circulates the liquid 103 within the container 101, the sorbent 125 or resin 126 within each cartridge 105 may come into contact and absorb PFAS floating near the surface of the liquid 103 more efficiently.

Finally, FIG. 7B shows that an embodiment of the drop-in treatment apparatus 700 may utilize multiple tethered buoys 610 to provide a quicker and more efficient treatment of PFAS located near the surface of the liquid 103. While FIGS. 1A to 7B show various embodiments of the drop-in treatment apparatus utilizing a floating configuration, flow through configuration, or tethered buoy configuration, it is understood that additional embodiments of the drop-in treatment apparatus (not shown) may utilize various combinations of such, as for example a flow through configuration with a tethered buoy.

FIGS. 8A and 8B are illustrations of exploded views of the cartridge 105 and show a cartridge 105 without a mesh container 130 and another cartridge 105 with a mesh container 130, respectively. As recited above, the mesh container 130 may store or hold sorbent 125 or resin 126 for ease of installation or disposal. In particular, when installing the sorbent 125 or resin 126 into the cartridge 125, a user may simply insert the mesh container 130 having a prescribed amount of sorbent 125 or resin 126 into the cartridge 105. Conversely, after treatment of the PFAS-impacted liquid 103 using the drop-in treatment apparatus 100, 200, 300, 400, 500, the user can easily discard the used sorbent 125 or resin 126 by disposing the mesh container 130 along with its contents (rather than picking out the wet sorbent/resin out of the cartridge 105).

Finally, FIGS. 8A and 8B both show that embodiments of the cartridge 105 may comprise two pieces (e.g., bottom container 108 having a removable top cover 109) in order to allow easy installation of the mesh container 130 and sorbent 125 or resin 126 into the cartridge 105.

Testing, Materials, and Methods

In order to measure the effectiveness of the drop-in treatment apparatus 100, 200, 300, 400, 500, experiments were performed on site-specific IDW and synthetic IDW, the details of which are discussed in more detail below.

Site-specific IDW was derived from PFAS site investigations near the Pacific and Atlantic coasts of the continental United States, and these will be referred to as Site 1 IDW and Site 2 IDW, respectively. IDW from these sites contained well purge water, as well as small amounts of phosphate free detergent and isopropanol from field decontamination procedures.

Due to limitations to site-specific liquid IDW availability, synthetic IDW was also prepared to simulate on-site treatment of PFAS-containing liquid IDW in mesoscale vessels. A combination of groundwater ion concentrations derived from previous studies at Site 1 and water quality parameters from the IDW used in this study were used to guide the preparation of synthetic IDW. The synthetic IDW used in this study was composed of 3.88 g/L sodium chloride (Sigma, ACS reagent, ≥99%), 1.96 g/L anhydrous sodium sulfate (Sigma, ACS reagent, ≥99%), 0.70 g/L calcium chloride dihydrate (Fisher, Certified ACS), 0.15 g/L sodium bicarbonate (Sigma, ACS reagent, ≥99.7%), 0.01 g/L calcium nitrate tetrahydrate (Fisher, Certified ACS), 0.01 g/L Alconox detergent, and 0.26 mL/L isopropanol (Fisher, HPLC Grade, 99.9%) in deionized water. The pH was adjusted using 1 N NaOH.

Table 1 below shows water quality parameters from site-derived and synthetic IDW.

TABLE 1

|  | Site 1 IDW | Site 2 IDW | Float GAC | Float IX | Flow Through GAC | Flow Through IX |
|---|---|---|---|---|---|---|
| pH | 11.08 | 8.10 | 10.90 | 10.78 | 10.89 | 10.86 |
| ORP (mV) | 68.00 | 212.00 | 69.00 | 63.00 | 55.00 | 62.00 |
| Turbidity (NTU) | 130.00 | 267.00 | 0.40 | 0.50 | 0.40 | 0.50 |
| DO (mg/L) | 4.65 | 5.22 | 5.66 | 4.90 | 4.54 | 4.51 |
| TDS (g/L) | 1.47 | 0.82 | 7.14 | 7.14 | 7.06 | 7.10 |

Preparation of Sorbent and Resin 1 kg samples of bituminous GAC and a strong base anion exchange resin (IX) were provided. All GAC and IX resin used in this study were sieved within the range of 0.34-0.71 mm to ensure consistency between particle sizes, and each preparation was subsequently washed three times in 50 mL polypropylene (PP) tubes filled with MilliQ water to remove any residual solubles and fine particles. Following the final wash step, MilliQ water was decanted from the slurry, and the GAC was placed in a drying oven set at 90° C. for 24 hours to allow for evaporation of residual MilliQ water. The strong base IX resin comprised a polystyrene backbone crosslinked with divinylbenzene, and this was dried under a steady stream of filtered (1.2 μm) compressed air for 24 hours to ensure maintenance of the resin's physical integrity throughout its preparation.

For bench scale experiments, polypropylene mesh (0.15 mm mesh size) was cut into 50.8×50.8 mm squares, and three corners from each square were subsequently heat welded to allow for the addition of the washed GAC or IX resin. The remaining corner of the PP mesh enclosures were heat welded following the addition of 40, 200, or 400 mg GAC or IX resin to fully encapsulate the particles, and this brought experimental concentrations of GAC or IX to either 0.1, 0.5, or 1.0 mg/mL. Mesh bags for the mesoscale study were prepared similarly to that of the bench scale experiments. Mesoscale tests used four mesh bags (76.2×76.2 mm) filled with 4.73 g (18.93 g total; 0.5 mg/mL) of GAC or IX per vessel.

Determination of Optimal GAC and IX Mass Loading

Organic and inorganic constituents contained within liquid site-derived IDW matrices may present limitations with respect to PFAS sorption affinity due to GAC and IX active site competition. Consequently, initial batch sorption studies with scaled GAC or IX mass-to-liquid ratios were constructed in high-density polyethylene (HDPE) bottles to account for changes in PFAS binding performance resulting from regional geochemical variability in IDW derived from Sites 1 and 2.

All HDPE bottles (500 mL) used throughout these experiments were washed with phosphate-free detergent in MilliQ water, which was further treated with an LC-Pak (Millipore Sigma) polishing cartridge. These were subsequently rinsed three times in isopropanol (≥99.9%, Fisher, HPLC Grade), prior to a final rinse in MilliQ water. After air drying, 400 mL of IDW derived from either Site 1 or 2 was aliquoted into decontaminated bottles prior to the addition of the PP mesh bags containing either GAC or IX, for which the GAC or IX was scaled in concentrations of 0.1 mg/mL, 0.5 mg/mL, or 1 mg/mL as single experimental treatments. All bottles were capped and agitated on a shaker table at 100 RPM for 10 days prior to sampling. A total of 10 days of circulation was chosen to ensure proper equilibration between all PFAS analytes in solution and GAC or IX. This initial study required constant circulation, and submersible pumps were omitted on account of their poor longevity under constant operation. After 10 days, containers were removed from the shaker table and briefly agitated by shaking to better distribute PFAS localized at the air-water interface throughout the bulk liquid. Controls containing sorbents, run in the absence of circulation, also underwent brief homogenization prior to sample withdrawal. Sample volumes of 15 mL were withdrawn, and these were centrifuged at 7,500 RPM to remove particulate contained within the IDW. A 10 mL aliquot of supernatant was withdrawn and stored in 15 mL PP centrifuge tubes at −20° C. until analysis.

Intermittent Circulation Studies

Next, bench scale studies were performed to simulate tank circulation, using optimized GAC or IX mass loading determined from the initial GAC and IX mass optimization experiments. Liquid IDW from either source was aliquoted into 500 mL HDPE bottles, which were decontaminated as described previously. Controls for this study were run in the absence of sorbents (PP mesh alone) or in the absence of circulation (containing 200 mg GAC or IX), and these were run in single bottles for each liquid matrix tested. Controls containing GAC or IX run in the absence of circulation were included to determine the necessity for liquid agitation. Controls run in the absence of sorbents were agitated for 10 minutes, every 30 minutes, for a total of 10 days. Triplicate experimental bottles were run in the presence of 0.5 mg/mL GAC or IX-containing PP mesh bags and circulation, where circulation occurred intermittently every 30 minutes for 10 minute intervals or every 120 minutes for 10 minute intervals. Circulation was provided by micro submersible pumps (5 V DC with dedicated 5V power supply), and both experimental bottles and controls were run in the presence of submerged pumps to account for any PFAS losses that may be associated with adhesion to pump surfaces, even in the absence of circulation. Each experiment was conducted for a period of 10 days, and following the completion of each experiment, individual sample bottles were briefly homogenized as described above. 40 mL samples were subsequently withdrawn and centrifuged for 30 minutes at 7,500 RPM to separate particulate matter contained within the IDW. Roughly 10 mL of each supernatant was withdrawn and stored at −20° C. in 15 mL PP tubes until analysis.

Effects of Scaled Chloride and Sulfate Concentrations

Elevated groundwater salinity at PFAS-impacted sites located near coastal regions is oftentimes attributed to seawater intrusion. The effects of high salt concentrations on PFAS affinity for GAC or IX is a topic of interest, as variability in salt loading may produce corresponding changes in hydrophobic and electrostatic interactions between PFAS and sorbents. To elucidate variations with respect to GAC or IX performance in liquids containing elevated chloride or sulfate (both of which are found in high concentrations in seawater), an additional batch sorption study was constructed.

Liquid aqueous film forming foam (AFFF) washout, which comprises a mixture of various PFAS-containing AFFF formulations and rinse water produced during fire suppression system clean out, was collected from a lined container in southern California for use as a concentrated stock solution for downstream batch sorption studies. The viscous liquid solution was subjected to vacuum filtration (glass fiber membrane) and three subsequent, slow freeze/thaw (−20° C./22° C.) cycles to clarify the solution and inactivate microbial biomass. The filtered AFFF washout was diluted (1:20) in MilliQ water, which was subjected to additional post-treatment using a LC-Pak Polisher (Millipore Sigma), and the AFFF-containing solution was stored at 4° C. until construction of the batch sorption study.

Sodium chloride (Sigma, ACS reagent, ≥99%) and sodium sulfate (Sigma, ACS reagent, ≥99%) solutions were prepared in MilliQ water at scaled concentrations. Sodium chloride solutions were prepared at concentrations of 20 g/L (seawater), 10 g/L, and 0.5 g/L, and sodium sulfate solutions were prepared at concentrations of 3 g/L (seawater), 1.5 g/L, 0.075 g/L. A 10 mL aliquot of a dilute, PFAS-containing AFFF solution was added to each preparation, bringing the final volume to 100 mL for each. The pH of each solution was adjusted to 7 with 1 N sodium hydroxide. Each mixture was stirred in HPDE beakers while aliquoting into duplicate 50 mL PP tubes containing either 15 mg GAC or IX (0.5 mg/mL final mass loading) to ensure that PFAS molecules accumulated at the air-water interface were adequately homogenized throughout the challenge solution, therefore ensuring greater consistency amongst experimental replicates. Each control and experimental treatment received 30 mL of challenge solution, and these were subsequently laid horizontally on an orbital shaker and subjected to circulation at 100 RPM for 10 days to ensure sufficient equilibration time for short chain PFAS and to keep circulation duration consistent. All tubes were centrifuged at 7,500 RPM for 20 minutes to ensure GAC or IX particles were settled following the completion of the batch sorption study. These were subsequently sampled by withdrawing 10 mL aliquots using clean PP pipettes. Aliquots were stored in 15 mL PP tubes at −20° C. until sample analysis.

Mesoscale Study

Mesoscale testing was conducted in 64 L opaque PP containers. Each container was filled with 37.85 L of deionized water, and synthetic IDW constituents were mixed using individual Proactive Cyclone 12 V plastic groundwater pumps, which were each powered with dedicated 12 V variable power supplies. Each container was amended with 5.0 mL PFAS-containing, filtered AFFF washout (concentrate) following dissolution of added salts. Water quality parameters were measured in each container with a calibrated Horiba U-52 multi-parameter water meter to ensure consistency between geochemical parameters for each set-up (see Table 1), and after 1 hour of mixing, the submersible pumps were powered down until the start of the experiment.

Four polypropylene mesh packets that contained either 4.73 g of GAC or IX were applied to each container of synthetic IDW. Packets were either attached to small polypropylene buoys (capped 50 mL PP Falcon tubes) to be localized near the air-water interface or placed in perforated HDPE bottles, which were attached to the effluent lines of the submersible pumps, such as the embodiments shown in FIGS. 1 and 2. The latter configuration in FIG. 1 allowed for direct contact between the mesh GAC or IX packets and bulk IDW pumped directly from the bottom of the container. Submersible pumps were cycled on for 10 minutes and off for 15 minutes to replicate the number of IDW volume turnovers as that from the 10 minute on/30 minute off cycling in the intermittent circulation study, and this was controlled by a digital timer into which the variable 12 V power supplies were plugged (See Table 2 below). Each container was covered with aluminum foil immediately following the construction of this study. Liquid samples (10 mL) were withdrawn every 5 days for a total of 10 days, and these were frozen at −20° C. until analysis.

Table 2 below shows the calculated frequency of vessel turnovers after 10 days of operation with submersible pumps cycled for 10 min ON and 120 min OFF.

TABLE 2

|  | Pump | Average Vessel Turnover | Standard Deviation |
|---|---|---|---|
| GAC Replicate 1 | 1 | 2006.0 | 178.6 |
| GAC Replicate 2 | 2 | 2005.0 | 127.6 |
| GAC Replicate 3 | 3 | 2026.0 | 44.2 |
| IX Replicate 1 | 4 | 2166.0 | 57.2 |
| IX Replicate 2 | 5 | 2178.0 | 36.5 |
| IX Replicate 3 | 6 | 1920.0 | 66.8 |
| No Sorbent Control | 7 | 2076.0 | 57.9 |

PFAS Analysis

Each sample was vortexed in the original 15 mL PP sample container prior to subsampling for analysis. A 0.3 mL aliquot of sample was transferred to a falcon tube, fortified with extracted internal standards and injection internal standards, and the final volume was adjusted to 1 mL with methanol. The sample was then vortexed and aliquoted for analysis. A procedural blank, laboratory control spike (fortified with targets) and a sample duplicate was prepared with each batch of samples. In all four batches, all QC samples, including extracted internal standard recoveries, passed all criteria.

PFAS were subsequently measured by liquid chromatography tandem mass spectrometry (LC-MS/MS) in the multiple reaction monitoring (MRM). An initial calibration consisting of representative target analytes, labelled analogs, and internal standards was analyzed prior to analysis to demonstrate the linear range of analysis. Calibration verification was performed at the beginning and end of 10 injections and at the end of each sequence. Target PFAS were quantified using the isotope dilution method. Samples are reported in µg/L concentrations. Based on the concentration of the low standard, adjusted for the sample size used, the limit of quantification was set at 0.08 µg/L, no results detected below this concentration were reported.

Selected liquid split samples (250 mL) from the mesoscale study were submitted to a NELAP accredited commercial analytical laboratory and analyzed according to Table B-15 of DoD Quality Systems Manual version 5.3 to confirm combined PFOS and PFOA removal below 0.07 µg/L (federally promulgated health advisory for drinking water), as well as expand the overall list of PFAS analytes. A total of 24 PFAS compounds were screened and quantified, and limits of detection and quantitation for each analyte may be found in Table 3 below.

Table 3 shows the limits of quantitation and limits of detection for 24 PFAS analytes for samples analyzed according to Table B-15 of DoD Quality Systems Manual version 5.3.

TABLE 3

| Compound | LOQ (ug/L) | LOD (ug/L) |
|---|---|---|
| Perfluorobutanoic acid | 0.008 | 0.004 |
| Perfluoropentanoic acid | 0.004 | 0.002 |
| Perfluorohexanoic acid | 0.04 | 0.02 |
| Perfluoroheptanoic acid | 0.004 | 0.002 |
| Perfluorooctanoic acid | 0.004 | 0.002 |
| Perfluorononanoic acid | 0.004 | 0.002 |
| Perfluorodecanoic acid | 0.004 | 0.002 |
| Perfluoroundecanoic acid | 0.04 | 0.02 |
| Perfluorododecanoic acid | 0.04 | 0.02 |
| Perfluorotridecanoic acid | 0.004 | 0.002 |
| Perfluorotetradecanoic acid | 0.004 | 0.002 |
| Perfluorobutanesulfonic acid | 0.004 | 0.004 |
| Perfluoropentanesulfonic acid | 0.004 | 0.004 |
| Perfluorohexanesulfonic acid | 0.04 | 0.04 |
| Perfluoroheptanesulfonic acid | 0.004 | 0.004 |
| Perfluorooctanesulfonic acid | 0.04 | 0.04 |
| Perfluorononanesulfonic acid | 0.004 | 0.004 |
| Perfluorodecanesulfonic acid | 0.004 | 0.004 |
| PFOSA | 0.004 | 0.002 |
| MeFOSAA | 0.02 | 0.008 |
| EtFOSAA | 0.02 | 0.008 |
| 4:2 Fluorotelomer sulfonate | 0.008 | 0.004 |
| 6:2 Fluorotelomer sulfonate | 0.08 | 0.04 |

Results and Discussion

Determination of Optimal GAC or IX Mass Loading

Mechanistic understandings of factors affecting PFAS binding performance with GAC and IX have yet to be fully elucidated, but various constituents contained within environmentally-derived matrices may affect the overall sorbent or resin treatment performance as a result of phenomena that are inclusive of binding site competition and/or fouling. Thus, an initial batch sorption study was constructed to determine optimal sorbent or resin loading for Site 1 and Site 2 IDW samples (See Table 4 below). Nearly complete removal (>99.0%) of PFOS and perfluorohexanesulfonate (PFHxS), was observed for both GAC and IX with mass loadings ranging from 0.5-1.0 mg/L in both Site 1 and Site 2 IDW. Experimental groups containing GAC and IX in the range of 0.5-1.0 mg/mL showed PFOA mass removal in the range of 94.6-96.7% for both challenge solutions. IX showed the greatest PFAS removal performance in mass loadings ranging from 0.1-1.0 mg/mL in Site 2 IDW (See Table 4). Treatments containing GAC had similar results at mass loadings of 0.5-1.0 mg/mL for Site 1 IDW (See Table 4). Diminished performance was observed using IX (0.1 mg/mL) in Site 1 IDW, and this is likely due to elevated levels of dissolved solids contained within this matrix. No removal of short chain perfluorocarboxylates and perfluorosulfonates (perfluorobutanoate [PFBA] and perfluorobutanesulfonate [PFBS]) was observed using IX in Site 1 IDW (0.1 mg/mL), while PFBS and PFBA removal was observed to be 94.9% and 6.8%, respectively, in the presence of 0.1 mg/mL GAC (See Table 4).

Table 4 shows the PFAS removal results from an initial batch sorption study with GAC or IX masses ranging from 40-400 mg in 400 mL of IDW from Site 1 or Site 2. Data are representative of single experimental treatments or controls. Negative values may have resulted from experimental error associated with sampling stratified PFAS in sample aliquots.

TABLE 4

|  | PFBA (µg/L) | PFHxA (µg/L) | PFOA (µg/L) | PFBS (µg/L) | PFHxS (µg/L) | PFOS (µg/L) |
|---|---|---|---|---|---|---|
| No Sorbent Control | −0.165 | −0.057 | 0.086 | −0.331 | −0.134 | 3.961 |
| No Agitation Control (40 mg GAC) | 0.073 | 0.511 | 0.443 | 0.322 | 1.223 | 4.815 |
| No Agitation Control (40 mg IX) | 0.016 | 0.576 | 0.553 | 0.437 | 2.259 | 6.021 |
| 40 mg GAC | 0.056 | 2.640 | 1.406 | 1.491 | 8.407 | 10.878 |
| 200 mg GAC | 0.325 | 3.021 | 1.406 | 1.491 | 8.407 | 10.878 |
| 400 mg GAC | 0.361 | 3.048 | 1.406 | 1.491 | 8.407 | 10.878 |
| 40 mg IX | −0.065 | 1.090 | 1.143 | 0.434 | 6.415 | 9.461 |

TABLE 4-continued

| | PFBA (µg/L) | PFHxA (µg/L) | PFOA (µg/L) | PFBS (µg/L) | PFHxS (µg/L) | PFOS (µg/L) |
|---|---|---|---|---|---|---|
| 200 mg IX | −0.002 | 2.946 | 1.406 | 1.486 | 8.407 | 10.878 |
| 400 mg IX | 0.273 | 3.048 | 1.406 | 1.491 | 8.407 | 10.878 |
| No Sorbent Control | −0.108 | 0.279 | 0.132 | 0.129 | 0.681 | 0.122 |
| No Agitation Control (40 mg GAC) | 0.074 | 0.908 | 0.626 | 0.128 | 1.315 | 2.333 |
| No Agitation Control (40 mg IX) | 0.007 | 1.046 | 0.549 | 0.511 | 0.897 | 1.427 |
| 40 mg GAC | 0.147 | 3.345 | 2.088 | 1.879 | 7.805 | 15.165 |
| 200 mg GAC | 0.513 | 4.763 | 2.339 | 2.488 | 8.717 | 16.251 |
| 400 mg GAC | 0.736 | 4.763 | 2.339 | 2.488 | 8.717 | 16.251 |
| 40 mg IX | 0.428 | 4.620 | 2.339 | 2.488 | 8.717 | 16.251 |
| 200 mg IX | 0.583 | 4.763 | 2.339 | 2.488 | 8.717 | 16.251 |
| 400 mg IX | 0.627 | 4.763 | 2.339 | 2.488 | 8.717 | 16.251 |

Mass removal of perfluorohexanoate (PFHxA), PFBA, PFOA, PFBS, PFHxS, and PFOS was observed in controls run in the absence of circulation but in the presence of GAC or IX for Sites 1 and 2 IDW (See Table 4). Controls run in the absence of GAC and IX showed minimal (<8%) PFHxS, PFBS, PFOA, and PFHxA removal in Site 1 IDW. Elevated PFOS and PFOA mass removal was observed in Site 2 IDW controls, which did not contain GAC or IX, but this was not observed for PFHxS, PFBS, PFHxA, or PFBA. PFAS mass removal, even in the absence of sorbent and resin may be attributed to PFAS adhesion to polypropylene mesh surfaces. Overall, this initial study estimated the minimum mass of GAC or IX required to significantly reduce PFAS mass in liquid IDW derived from Sites 1 and 2. From the perspectives of cost avoidance and increased treatment efficiency, preliminary optimization of virgin sorbent or resin masses used to treat site-specific IDW will ultimately decrease upfront costs linked to GAC or IX procurement. Furthermore, lower GAC or IX mass requirements will decrease costs associated with spent solid disposal, especially in the absence of on-site regeneration technologies.

Intermittent Circulation Study

FIG. 9 shows the average PFAS removal in the presence and absence of 0.5 mg/mL GAC or IX in Site 1 and Site 2 IDW. Panes A and B correspond to PFAS removal data from Site 1 IDW, and panes C and D correspond to PFAS removal data from Site 2 IDW. NSC represents controls run in the absence of GAC or IX but in the presence of agitation. No agitation control (NAC) corresponds to controls run in the absence of agitation but in the presence of either GAC or IX. Experimental triplicates subjected to submersible pump cycling every 30 minutes (for a 10 minute duration) are designated as 30/10, and bars corresponding to these data are represented with diagonal line patterns within the figure. Experimental triplicates subjected to submersible pump cycling every 120 minutes (for a 10 minute duration) are designated as 120/10, and these data are represented with horizontal line patterns. Error bars denote standard deviation between experimental triplicates. Controls run in the absence of sorbents or agitation were each conducted in single vessels.

A comparison of PFAS removal capacities of GAC and IX from Site 1 and 2 IDW are presented in FIG. 9. Initial PFAS concentrations in Site 1 and Site 2 IDW are listed in Table 5 below. Unlike the previous batch sorption study in this report in which experimental treatments were subjected to constant circulation, this study varied circulation for 10 minutes every 30 minutes or 120 minutes over a 10 day period. IX maintained the highest and most consistent PFAS removal performance in both site-specific IDW matrices for six different PFAS compounds (See B and D of FIG. 9). This result was surprising, especially for Site 1 IDW, as it is assumed that elevated TDS would foster binding site competition on the anion exchange resin (1.47 g/L TDS; See Table 1). However, electrostatic interactions of polystyrene backbone of IX resin could potentially play a role in enhancing PFAS binding in comparison to that which was observed in treatments containing GAC. The data presented in B and D of FIG. 9 demonstrate that there were no noticeable differences in PFAS removal performance at the two circulation frequencies tested in IX-amended treatments.

Table 5 shows the initial PFAS concentrations observed in IDW from Site 1 and Site 2.

TABLE 5

| | Site 1 IDW (µg/L) | Site 2 IDW (µg/L) |
|---|---|---|
| PFBA | 0.82 | 1.05 |
| PFHxA | 3.13 | 4.84 |
| PFOA | 1.49 | 2.42 |
| PFBS | 1.57 | 2.57 |
| PFHxS | 8.49 | 8.80 |
| PFOS | 10.96 | 16.33 |

PFAS removal performance for 0.5 mg/mL GAC from Site 1 and Site 2 IDW in the presence and absence of intermittent circulation are listed in A and C, respectively, of FIG. 9. GAC sorption performance in both challenge solutions was slightly diminished in comparison to that of IX for six PFAS analytes. In experimental treatments that were subjected to 10 minutes of circulation every 30 minutes for 10 days, respective PFOS and PFOA reduction in GAC amended treatments was 8.1 and 12.5% less than that was observed for IX amended treatments in Site 1 IDW (See A-D of FIG. 9). PFOS and PFOA reduction levels in vessels containing GAC were similar to that of IX-containing vessels when Site 2 IDW was used as the challenge solution. Differences in short chain perfluorocarboxylate (PFHxA and PFBA) and perfluorosulfonate (PFHxS and PFBS) removal were slightly less in GAC amended treatments than that of IX, but these values were also negligible (See A-D of FIG. 9). Circulation frequency had little effect on PFAS removal performance between the two circulation conditions tested, and these results were similar to those observed in IX-amended experimental treatments (See A and C of FIG. 9). In general, PFAS removal was negligible between IX or GAC-containing vessels tested in both Site 1 and Site 2 IDW, and these data are consistent with findings observed in the initial GAC and IX mass loading experiment (See Table 4).

Substantial PFAS mass reduction was observed in the Site 1 IDW control group that was run in the absence of GAC or IX but in the presence of submersible pump circulation (See A and B of FIG. 9, NSC). These results, especially with respect to PFOS removal, are similar to those observed in the initial GAC and IX mass loading study (See Table 4). HDPE and PP containers and equipment are recommended for use in PFAS sampling since these materials have low affinity for PFAS compared to other commonly used materials, such as glass, but the results of this study in the absence of sorbents suggest that alternate materials or whole-vessel extraction processes should be investigated for conducting future laboratory treatability testing. Alternately, the observed PFAS reduction in Site 1 controls in the absence of sorbents may be attributed to sampling procedures used in this study. Prior to sampling after 10 days of operation, each bottle was homogenized by shaking, in order to better distribute PFAS that may be localized at the air-water interface throughout the bulk liquid prior to sample withdrawal using a PP pipette. The potential for PFAS re-stratification at the onset of sample withdrawal may have also accounted for a less homogenous sample. However, details with respect to the rates of PFAS stratification in liquid and migration to the air-water interface have yet to be elucidated in the literature.

Effects of Salt Loading on PFAS Removal

To better understand PFAS removal from IDW at varying levels of ionic strength, such that may be found in environments in which liquid environmental matrices are saline or brackish in nature, batch sorption studies were conducted using individually scaled concentrations of two major anionic constituents (chloride and sulfate) found in marine environments. Nearly complete PFAS removal was observed in both GAC and IX amended experimental replicates in the presence of 0.075-3 g/L sulfate or 0.5-20 g/L chloride (See FIG. 10 and Table 5 below). Chloride and sulfate concentrations were chosen as an upper bound since seawater typically contains 19,400 mg/L chloride and 2,600 mg/L sulfate. PFBA mass reduction in both GAC and IX-containing experimental replicates were only slightly diminished in concentrations of 20 g/L chloride, while decreases in PFHxA removal performance was only observed in IX-containing replicates in the presence of 20 g/L chloride (See FIG. 10). PFBA removal performance in experimental replicates containing IX and 20 g/L chloride was 3.3-3.8-fold less than that was observed in the control containing IX, run in the absence of added salts, and PFHxA mass removal was roughly 1.3-fold less than that of the control run in the absence of added chloride (See FIG. 10). Given that substantial PFAS mass reduction was observed for most of the analytes tested, these data indicate that both GAC and IX may be used to treat IDW in batch, even in the presence of high salt concentrations. These data are in agreement with previous studies which have indicated that enhanced PFAS removal in the presence of elevated salt concentrations may be attributed to decreased PFAS solubility and altered electrostatic interactions of sorbent surfaces. Further, under high salt concentrations, PFAS affinity for organic and inorganic sorbent surfaces showed corresponding increases to salt loading. Assuming active site exhaustion of the strong base anion resin would occur in the presence of 20 g/L chloride or 3 g/L sulfate, it is possible that hydrophobic and electrostatic interactions between PFAS molecules (specifically sulfonated PFAS and long chain perfluorocarboxylates, such as PFOA) and the polystyrene backbone of the resin may offer an additional explanation with respect to maintenance of PFAS mass reduction in experimental replicates containing IX.

Figure 10:
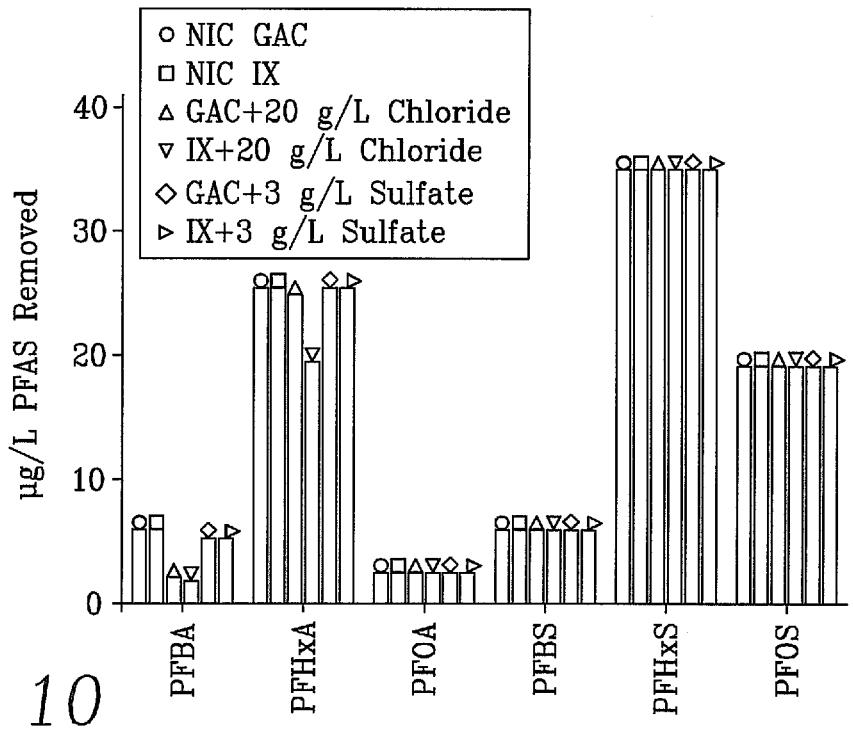
FIG. 10 shows the effects of 20 g/L chloride or 3 g/L sulfate on PFAS mass removal to 0.5 mg/mL GAC or IX.

FIG. 10 shows the effects of 20 g/L chloride or 3 g/L sulfate on PFAS mass removal to 0.5 mg/mL GAC or IX. Data are representative of two replicates per experimental treatment or control. NIC denotes controls run in the absence of chloride or sulfate.

Table 5 below shows the total PFAS removed by 0.5 mg/mL GAC or IX with scaled chloride or sulfate concentrations in MilliQ water. Data are listed in μg/L PFAS removed.

TABLE 5

|  | Rep. | PFBA | PFHxA | PFOA | PFBS | PFHxS | PFOS |
|---|---|---|---|---|---|---|---|
| NIC GAC | 1 | 5.962 | 25.568 | 2.488 | 6.086 | 35.071 | 19.173 |
|  | 2 | 5.951 | 25.568 | 2.488 | 6.086 | 35.071 | 19.173 |
| NIC IX | 1 | 6.014 | 25.568 | 2.488 | 6.086 | 35.071 | 19.173 |
|  | 2 | 6.280 | 25.568 | 2.488 | 6.086 | 35.071 | 19.173 |
| 0.5 g/L Chloride | 1 | 5.251 | 25.489 | 2.488 | 6.086 | 35.071 | 19.173 |
| GAC | 2 | 4.816 | 25.419 | 2.488 | 6.086 | 35.071 | 19.173 |
| 10 g/L Chloride | 1 | 2.986 | 25.062 | 2.488 | 6.058 | 35.071 | 19.173 |
| GAC | 2 | 3.528 | 25.248 | 2.488 | 6.086 | 35.071 | 19.173 |
| 20 g/L Chloride | 1 | 1.874 | 25.022 | 2.488 | 6.070 | 35.071 | 19.173 |
| GAC | 2 | 2.548 | 25.057 | 2.488 | 6.067 | 35.071 | 19.173 |
| 0.5 g/L Chloride | 1 | 5.438 | 25.278 | 2.488 | 6.086 | 35.071 | 19.173 |
| IX | 2 | 5.476 | 25.254 | 2.488 | 6.086 | 35.071 | 19.173 |
| 10 g/L Chloride | 1 | 2.828 | 22.134 | 2.488 | 6.086 | 35.071 | 19.173 |
| IX | 2 | 2.547 | 22.048 | 2.488 | 6.086 | 35.071 | 19.173 |
| 20 g/L Chloride | 1 | 1.600 | 18.988 | 2.272 | 6.079 | 34.898 | 19.173 |
| IX | 2 | 1.876 | 20.216 | 2.455 | 6.086 | 35.062 | 19.173 |
| 0.075 g/L. | 1 | 5.516 | 25.442 | 2.488 | 6.086 | 35.071 | 19.173 |
| Sulfate GAC | 2 | 5.623 | 25.513 | 2.488 | 6.086 | 35.071 | 19.173 |
|  | 1 | 5.117 | 25.406 | 2.488 | 6.086 | 35.071 | 19.173 |
| 1.5 g/L Sulfate GAC | 2 | 5.059 | 25.394 | 2.488 | 6.086 | 35.071 | 19.173 |
| 3 g/L. Sulfate | 1 | 4.708 | 25.201 | 2.488 | 6.086 | 35.071 | 19.173 |
| GAC | 2 | 4.950 | 25.392 | 2.488 | 6.086 | 35.071 | 19.173 |
| 0.075 g/L | 1 | 5.921 | 25.568 | 2.488 | 6.086 | 35.071 | 19.173 |
| Sulfate IX | 2 | 5.901 | 25.496 | 2.488 | 6.086 | 35.071 | 19.173 |
| 1.5 g/L Sulfate | 1 | 5.368 | 25.225 | 2.488 | 6.086 | 35.071 | 19.173 |
| IX | 2 | 5.357 | 25.283 | 2.488 | 6.086 | 35.071 | 19.173 |
| 3 g/L Sulfate IX | 1 | 5.265 | 25.193 | 2.488 | 6.086 | 35.071 | 19.173 |
|  | 2 | 5.287 | 25.208 | 2.488 | 6.086 | 35.071 | 19.173 |

Mesoscale Study

Liquid IDW produced during PFAS site investigations is typically stored in drums until off-site disposal. In larger applications, such as construction dewatering near sites with suspected PFAS release, these volumes may greatly increase, and more appropriate containment may be used to handle these volumes. This study sought to compare treatment efficiencies between data derived from bench scale studies and mesoscale vessels, in which volumes of the latter were roughly 20% of that of a full 208 L (55 gallon) drum, or 100-fold greater than bench scale experiments. PFAS removal performance for two configurations, which localized GAC or IX either near the air-water interface or near submersible pump effluent ports was compared, and these results are summarized in Table 6 below. After 10 days of intermittent circulation with either GAC or IX, combined PFOS and PFOA concentrations were reduced to below 0.07 μg/L for both configurations (Table 6). Time course visualization of PFAS removal revealed that considerable removal of PFOS, PFHxS, PFBS, and PFBA occurs within the first 5 days of vessel cycling (See FIGS. 10A to 10D).

Figure 11A:
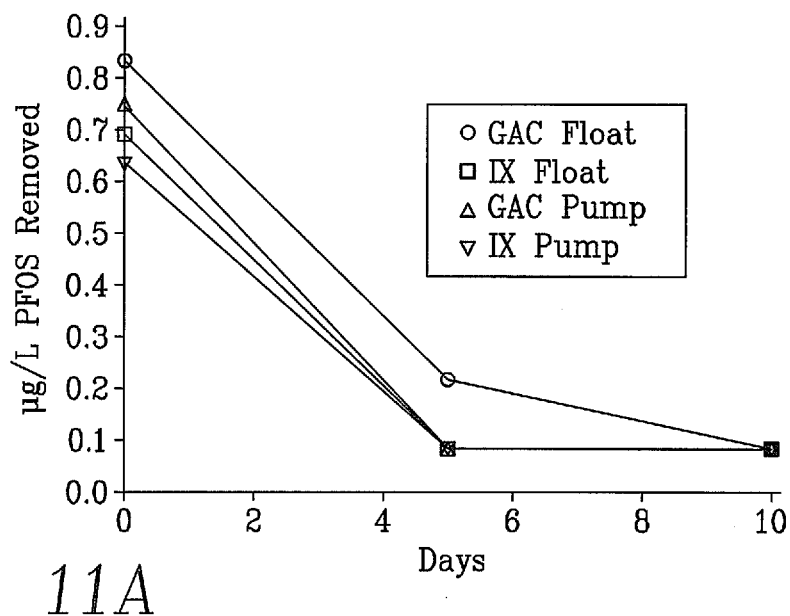
FIGS. 11A to 11D are graphs illustrating a time course of PFOS, PFHxS, PFBS, and PFBA removal from mesoscale vessels.

FIGS. 11A to 11D are graphs illustrating a time course PFOS, PFHxS, PFBS, and PFBA removal from mesoscale vessels. Specifically, FIG. 11A is a graph illustrating a time course PFOS removal from mesoscale vessels. Floating GAC or IX configurations are represented by circles or squares, respectively. Flow-through configurations using GAC or IX are represented by upward facing and downward facing triangles, respectively.

Figure 11B:
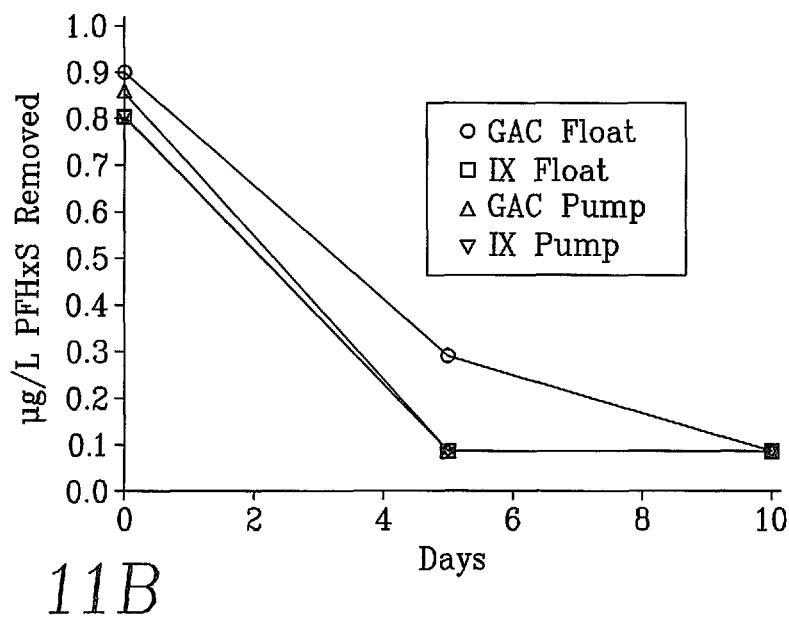

FIG. 11B is a graph illustrating a time course PFHxS removal from mesoscale vessels. Floating GAC or IX configurations are represented by circles or squares, respectively. Flow-through configurations using GAC or IX are represented by upward facing and downward facing triangles, respectively.

Figure 11C:
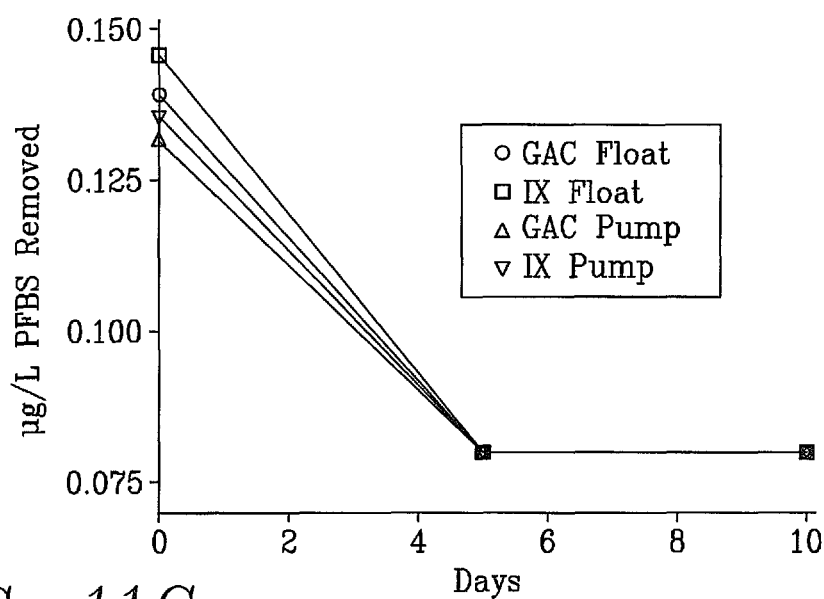

FIG. 11C is a graph illustrating a time course PFBS removal from mesoscale vessels. Floating GAC or IX configurations are represented by circles or squares, respectively. Flow-through configurations using GAC or IX are represented by upward facing and downward facing triangles, respectively.

Figure 11D:
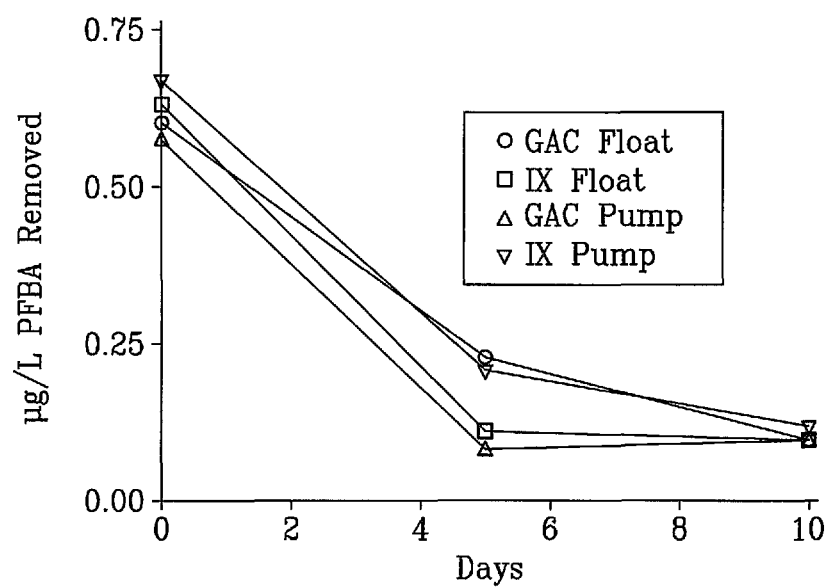

FIG. 11D is a graph illustrating a time course PFBA removal from mesoscale vessels. Floating GAC or IX configurations are represented by circles or squares, respectively. Flow-through configurations using GAC or IX are represented by upward facing and downward facing triangles, respectively.

Nearly complete perfluorosulfonate and perfluorocarboxylate removal was observed for all treatments, with the exception of short chain perfluorocarboxylates such as, perfluorohexanoate (PFHxA; IX only), perfluoropentanoate (PFPeA), and perfluorobutanoate (PFBA), and these data are consistent with previous reports which describe difficulties in treating short chain perfluorocarboxylates (Table 6). GAC localized near the air-water interface or near the pump effluent showed a 5-fold and 23-fold increase in 6:2 fluorotelomer sulfonate removal in comparison to that of similar configurations containing IX, respectively (Table 6).

Table 6 shows PFAS titers following 10 days treatment using GAC or IX and two different PFAS removal configurations in mesoscale vessels. C9-C14 perfluoroalkylcarboxylates, C9-C10 perfluoroalkylsulfonates, perflorooctanesulfonamides, perflorooctanesulfonamidoacetic acids, and 8:2 and 4:2 fluorotelomer sulfonates were not detected. Units are in μg/L (parts per billion).

TABLE 6

| Compound | Average Initial Conditions (μg/L) | GAC Float (μg/L) | IX Float (μg/L) | GAC Flow Through (μg/L) | IX Flow Through (μg/L) |
|---|---|---|---|---|---|
| Perfluorobutanoic acid | 0.253 ± 0.025 | 0.126 | 0.100 | 0.121 | 0.098 |
| Perfluoropentanoic acid | 0.204 ± 0.003 | 0.026 | 0.061 | 0.027 | 0.064 |
| Perfluorohexanoic acid | 0.646 ± 0.009 | 0.025 | 0.101 | 0.009 | 0.097 |
| Perfluoroheptanoic acid | 0.049 ± 0.001 | 0.001 | 0.005 | 0.002 | 0.003 |
| Perfluorooctanoic acid | 0.086 ± 0.001 | 0.002 | 0.008 | 0.002 | 0.003 |
| Perfluorobutane-sulfonic acid | 0.159 ± 0.003 | 0.005 | 0.003 | 0.002 | 0.002 |
| Perfluoropentane-sulfonic acid | 0.167 ± 0.004 | 0.004 | 0.003 | 0.002 | 0.002 |
| Perfluorohexane-sulfonic acid | 0.911 ± 0.038 | 0.018 | 0.017 | 0.001 | 0.003 |
| Perfluoroheptane-sulfonic acid | 0.057 ± 0.001 | 0.002 | 0.002 | 0.002 | 0.002 |
| Perfluorooctane-sulfonic acid | 0.735 ± 0.027 | 0.015 | 0.021 | 0.002 | 0.004 |
| 6:2 Fluorotelomer sulfonate | 0.632 ± 0.004 | 0.020 | 0.108 | 0.004 | 0.092 |

Cost Analysis

Treatment costs were estimated to better understand the economic feasibility of implementing this treatment strategy in the field, and cost ranges at mass loadings of 0.1 mg/mL and 0.5 mg/mL are listed in Tables 7-10 below. These estimates were inclusive of estimated exhausted solid disposal costs, pump replacement, overall power consumption, and sorbent or resin mass used. Estimates for labor were not included in this analysis, but majority of labor costs for this approach would be associated with initial deployment and retrieval of the pumps and spent sorbent or resin. Costs for power consumption and sorbent or resin mass were scaled to account for potential future variability. Data from these calculations suggest that overall costs to treat a single 208 L drum (55-gallon) of PFAS-containing liquid IDW range between $42-53 per barrel, assuming there are similar conditions to that which were presented in this study. Pump replacement accounted for roughly 76-96% of overall costs. Upfront investment in pumps with greater longevity and optimization of liquid circulation frequency are two strategies that may be used to overcome this limitation. Alternatively, other passive circulation methods may be employed to lower costs associated with pump replacement.

Table 7 shows the range of total IDW treatment costs per 55 gallon drum comparing scaled sorbent/resin (0.1 mg/mL) and power costs. Costs are inclusive of PFAS impacted solids disposal, power, cost of submersible pump (consumable), as well as total cost of sorbent or resin mass used.

TABLE 7

| | | \multicolumn{9}{c}{Estimated Cost per Gram Sorbent or Resin ($USD) (fixed at 0.1 mg/mL)} | | | | | | | | |
|---|---|---|---|---|---|---|---|---|---|---|
| | | $0.005 | $0.010 | $0.015 | $0.020 | $0.025 | $0.030 | $0.035 | $0.040 | $0.045 | $0.050 |
| Estimated Cost per kWh ($USD) | $0.100 | $41.55 | $41.66 | $41.76 | $41.86 | $41.97 | $42.07 | $42.18 | $42.28 | $42.38 | $42.49 |
| | $0.150 | $41.94 | $42.04 | $42.14 | $42.25 | $42.35 | $42.46 | $42.56 | $42.66 | $42.77 | $42.87 |
| | $0.200 | $42.32 | $42.42 | $42.53 | $42.63 | $42.74 | $42.84 | $42.94 | $43.05 | $43.15 | $43.26 |
| | $0.250 | $42.70 | $42.81 | $42.91 | $43.02 | $43.12 | $43.22 | $43.33 | $43.43 | $43.54 | $43.64 |
| | $0.300 | $43.09 | $43.19 | $43.30 | $43.40 | $43.50 | $43.61 | $$43.71 | $43.82 | $43.92 | $44.03 |
| | $0.350 | $43.47 | $43.58 | $43.68 | $43.78 | $43.89 | $43.99 | $44.10 | $44.20 | $44.30 | $44.41 |
| | $0.400 | $43.86 | $43.96 | $44.06 | $44.17 | $44.27 | $44.38 | $44.48 | $44.58 | $44.69 | $44.79 |
| | $0.450 | $44.24 | $44.34 | $44.45 | $44.55 | $44.66 | $44.76 | $44.86 | $44.97 | $45.07 | $45.18 |
| | $0.500 | $44.62 | $44.73 | $44.83 | $44.94 | $45.04 | $45.14 | $45.25 | $45.35 | $45.46 | $45.56 |

Table 8 shows the assumptions used for calculating Table 7 cost estimates.

TABLE 8

| | |
|---|---|
| Mass of Sorbent or Resin Required per Barrel (grams) | 20.82 |
| Range for Spent Solid Disposal (per barrel) | $0.29-0.68* |
| Submersible Pump (2.5 barrel life cycle est.) | $40 |
| Electrical Power Consumed (kWh) | 7.68 |

*High range used for calculations

Table 9 shows the range of total IDW treatment costs per 55 gallon drum comparing scaled sorbent/resin (0.5 mg/mL) and power costs. Costs are inclusive of PFAS impacted solids disposal, power, cost of submersible pump (consumable), as well as total cost of sorbent or resin mass used.

TABLE 9

| | | Estimated Cost per Gram Sorbent or Resin ($USD) (fixed at 0.5 mg/mL) | | | | | | | | |
|---|---|---|---|---|---|---|---|---|---|---|
| | | $0.005 | $0.010 | $0.015 | $0.020 | $0.025 | $0.030 | $0.035 | $0.040 | $0.045 | $0.050 |
| Estimated | $0.100 | $44.28 | $44.39 | $45.74 | $46.26 | $46.78 | $47.30 | $47.82 | $48.34 | $48.86 | $49.38 |
| Cost | $0.150 | $44.67 | $44.77 | $46.12 | $46.64 | $47.16 | $47.69 | $48.21 | $48.73 | $49.25 | $49.77 |
| per | $0.200 | $45.05 | $45.15 | $46.51 | $47.03 | $47.55 | $48.07 | $48.59 | $49.11 | $49.63 | $50.15 |
| kWh | $0.250 | $45.43 | $45.54 | $46.89 | $47.41 | $47.93 | $48.45 | $48.97 | $49.49 | $50.01 | $50.54 |
| ($USD) | $0.300 | $45.82 | $45.92 | $47.28 | $47.80 | $48.32 | $48.84 | $49.36 | $49.88 | $50.40 | $50.92 |
| | $0.350 | $46.20 | $46.31 | $47.66 | $48.18 | $48.70 | $49.22 | $49.74 | $50.26 | $50.78 | $51.30 |
| | $0.400 | $46.59 | $46.69 | $48.04 | $48.56 | $49.08 | $49.61 | $50.13 | $50.65 | $51.17 | $51.69 |
| | $0.450 | $46.97 | $47.91 | $48.43 | $48.95 | $49.47 | $49.99 | $50.51 | $51.03 | $51.55 | $52.07 |
| | $0.500 | $47.35 | $48.29 | $48.81 | $49.33 | $49.85 | $50.37 | $50.89 | $51.41 | $51.93 | $52.46 |

Table 10 shows the assumptions used for calculating Table 9 cost estimates.

TABLE 10

| | |
|---|---|
| Mass of Sorbent or Resin Required per Barrel (grams) | 104.1 |
| Range for Spent Solid Disposal (per barrel) | $1.43-3.41* |
| Submersible Pump (2.5 barrel life cycle est.) | $40 |
| Electrical Power Consumed (kWh) | 7.68 |

*High range used for calculations

Test Conclusions

Per and polyfluoroalkyl substances (PFAS) are nearly ubiquitous in the environment at very low concentrations, and they can be found at very high concentrations at some sites where PFAS-containing materials have been used or manufactured. Site investigations to determine the presence, nature, and extent of PFAS impacts in groundwater typically generate multiple 55-gallon drums of solid and/or liquid IDW, which requires treatment and subsequent disposal.

Current practices of incineration, solidification (and subsequent landfilling), and/or direct landfilling of large volumes of PFAS-impacted liquid waste are costly and may heighten concern associated with potential secondary release. Effective IDW management procedures should be employed to both minimize risk while simultaneously lowering costs associated with PFAS-impacted IDW disposal. The findings from this study suggest that in addition to demonstrating effective removal of PFAS from IDW, the drop-in PFAS sequestration approach described in this report may offer multiple advantages over various continuous flow treatment strategies which employ sorption or IX processes to separate PFAS from liquids, and these include reduced labor and training requirements for system operation and troubleshooting, low footprint, increased potential for rapid mobilization, as well as decreased capital costs.

Water Quality Parameters

Water quality parameters of Site 1 IDW, Site 2 IDW, and mesoscale vessels containing synthetic IDW were measured with a Horiba U-52 water quality meter by direct submersion. The water quality meter was calibrated with Horiba calibration solution prior to performing measurements.

Micro Submersible Pump Longevity Testing

Issues associated with micro-submersible pump failure were encountered during initial iterations of this study. After a few days of complete submersion and intermittent power, it was discovered that pump housings were water-permeable at the wiring junction near the pump motor, and this caused short circuiting of the motor over time. In subsequent iterations, pumps were secured at a point to where only the influent and effluent ports were submerged, ensuring that water did not enter the wiring junction, thereby increasing pump longevity.

Micro Submersible Pump Flow Testing

A variable DC power supply set to 4.5 V was used to power submersible 5 V DC micro submersible pumps. Volumetric flow rates (mL/min) for each pump used in the intermittent circulation studies were measured by pumping deionized water from a beaker to a 1 L graduated cylinder, using silicone tubing for transfer lines. Flow rates were measured in this manner three times for each pump used in this study. Average flow rates and standard deviation between replicated measurements are listed in Table 11.

Table 11 below shows average flow rates (mL/min) measured for each pump utilized in the intermittent circulation study.

TABLE 11

| Pump | Average Flow Rate (mL/min) | Standard Deviation |
|---|---|---|
| 1 | 668.7 | 59.5 |
| 2 | 668.3 | 42.5 |
| 3 | 675.3 | 14.7 |
| 4 | 722.0 | 19.1 |
| 5 | 726.0 | 12.2 |
| 6 | 640.0 | 22.3 |
| 7 | 692.0 | 19.3 |

These data were subsequently used to calculate the total number of vessel turnovers over the course of 10 days of pump operation to inform required circulation for downstream studies and to determine if there was any substantial variability in circulation between each treatment in the intermittent circulation bench scale study. (Table 12).

Table 12 below shows calculated frequency of vessel turnovers after 10 days of operation with submersible pumps cycled for 10 min ON and 30 min OFF.

TABLE 12

|  | Pump | Average Vessel Turnover | Standard Deviation |
| --- | --- | --- | --- |
| GAC Replicate 1 | 1 | 8024.0 | 714.5 |
| GAC Replicate 2 | 2 | 8020.0 | 510.3 |
| GAC Replicate 3 | 3 | 8104.0 | 176.9 |
| IX Replicate 1 | 4 | 8664.0 | 228.9 |
| IX Replicate 2 | 5 | 8712.0 | 146.0 |
| IX Replicate 3 | 6 | 7680.0 | 267.3 |
| No Sorbent Control | 7 | 8304.0 | 231.4 |

Table 13 shows the calculated frequency of vessel turnovers after 10 days of operation with submersible pumps cycled for 10 min ON and 120 min OFF.

TABLE 13

|  | Pump | Average Vessel Turnover | Standard Deviation |
| --- | --- | --- | --- |
| GAC Replicate 1 | 1 | 2006.0 | 178.6 |
| GAC Replicate 2 | 2 | 2005.0 | 127.6 |
| GAC Replicate 3 | 3 | 2026.0 | 44.2 |
| IX Replicate 1 | 4 | 2166.0 | 57.2 |
| IX Replicate 2 | 5 | 2178.0 | 36.5 |
| IX Replicate 3 | 6 | 1920.0 | 66.8 |
| No Sorbent Control | 7 | 2076.0 | 57.9 |

Figure 12:
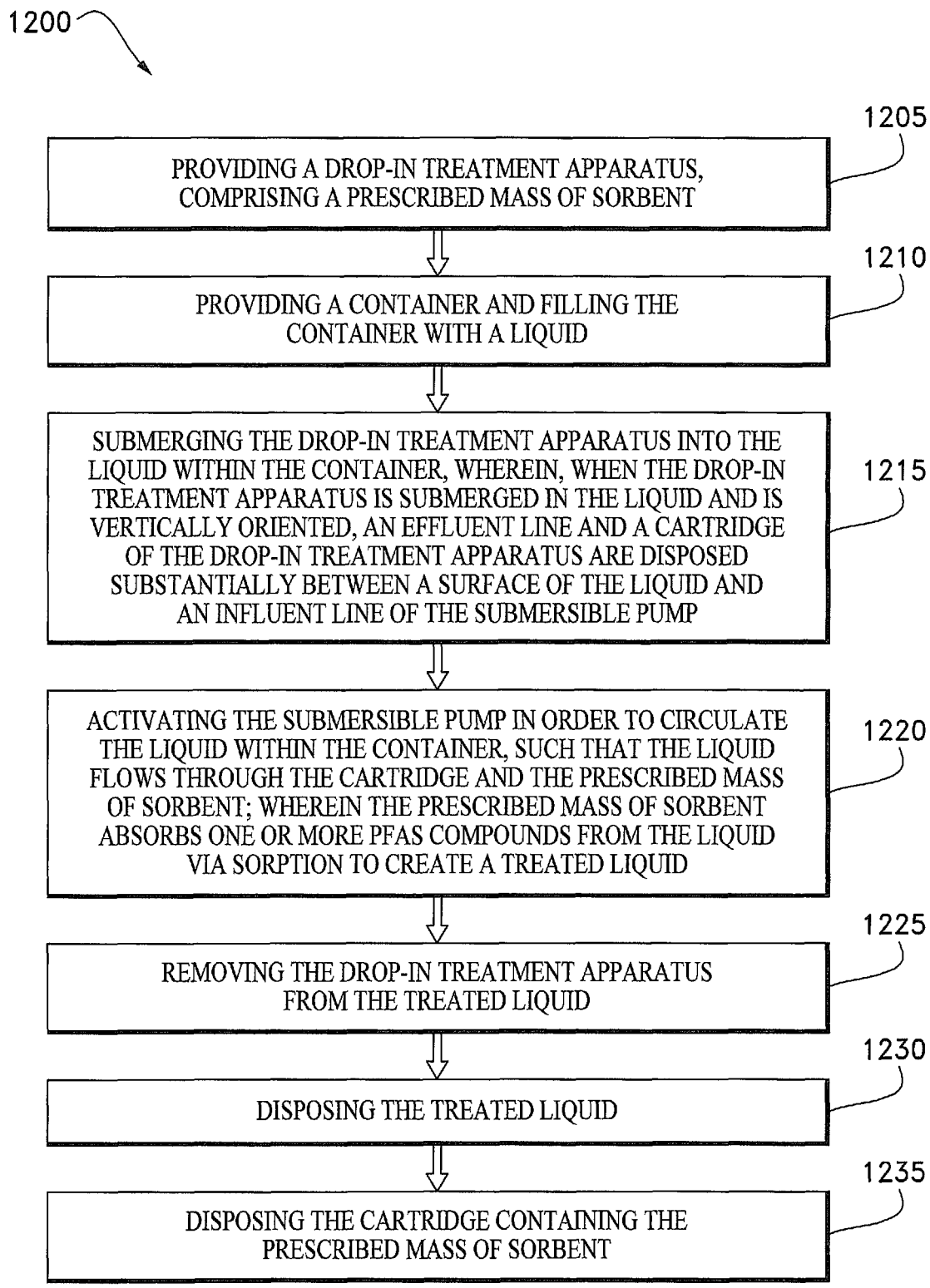
FIG. 12 is a flow chart of another embodiment of a method for treating PFAS-impacted liquids using a drop-in treatment apparatus.

FIG. 12 is a flow chart of another embodiment of a method 1200 for treating PFAS-impacted liquids 103 using a drop-in treatment apparatus 100, 200. As shown in FIG. 12, another embodiment of the method 1200 for treating PFAS-impacted liquids 103 using the drop-in treatment apparatus 100, 200 may comprise steps 1205, 1210, 1215, 1220, 1225, 1230, 1235. Specifically, FIG. 12 shows step 1205, which may be providing a drop-in treatment apparatus 100, 200, comprising a prescribed mass of sorbent 125. As discussed above, the drop-in treatment apparatus 100, 200 is preferably configured to remove PFAS from liquids in order to reduce the volume of PFAS-impacted waste requiring off-site disposal. This is preferably accomplished by concentrating PFAS onto various sorbents such as pyrogenic carbon, GAC, biochar, zeolite, and aluminosilicates. In one embodiment, the drop-in treatment apparatus 100 may comprise a prescribed mass of sorbent 125, submersible pump 110, cartridge 105, mesh container 130, and power source 115. The prescribed mass of sorbent 125 may be configured to absorb one or more PFAS compounds from a liquid via sorption and, in various embodiments, may range of approximately 0.1 to 100 mg per milliliter of the one or more PFAS compounds in the liquid. The submersible pump 110 may have an influent line 110a disposed at a lower end of the submersible pump 110 and an effluent line 110b disposed at an upper end of the submersible pump 110. The cartridge 105 may have a compartment configured to store the prescribed mass of sorbent 125 and may comprise multiple openings 106. The cartridge 105 may also be coupled to a downstream end of the effluent line 110b, such that the prescribed mass of sorbent 125 is in fluid communication with the effluent line 110b of the submersible pump 110. In various embodiments, the mesh container 130 may store the prescribed mass of sorbent 125, such that the mesh container 130 is disposed within the cartridge 105. The power source 115 may be electrically coupled to the submersible pump 110.

Additionally, FIG. 12 shows the next step 1210, which may be providing a container and filling the container with a liquid. Here, as described above, the container 101 is preferably used to store a liquid to be treated and is generally large enough to store a sufficient amount of liquid 103 to have the sorbent 125 absorb PFAS compounds from the liquid via sorption. In an embodiment, the sorbent 125 should be configured to absorb in the range of approximately 0.1 to 100 mg per milliliter of the one or more PFAS compounds in the liquid; thus, the container 101 is preferably large enough to store up to 21,000 gallons of liquid. However, in an exemplary embodiment, the container 101 is preferably a drum container configured to store up to approximately 55 gallons of a liquid. That way, once the liquid 103 has been treated, the liquid 103 can be easily transported between sites and disposed of, in accordance with various laws and regulations, for easier operation and mobilization costs. The liquid is preferably liquid containing PFAS or PFAS-impacted liquid 103.

FIG. 12 shows step 1215, which may be submerging the drop-in treatment apparatus into the liquid within the container. Here, when the drop-in treatment apparatus 100, 200 is submerged in the liquid 103, the drop-in treatment apparatus 100, 200 is preferably vertically oriented, as shown in FIGS. 3 and 6A to 6C. In particular, the drop-in treatment apparatus 100, 200 may be vertically oriented when the effluent line 110b of the drop-in treatment apparatus 200 and cartridge 105 are disposed substantially between a surface 103a of the liquid 103 and an influent line 110a of the submersible pump 110. That way, upon performing step 1220 (i.e., activating the submersible pump in order to circulate the liquid within the container), fluid located beneath the submersible pump 110 may be pumped into the influent line 110a and exit above the submersible pump 110 via the effluent line 110b. In this manner, (1) fluid or liquid 103 pumped into the submersible pump 110 may flow through the cartridge 105 and the prescribed mass of sorbent 125; and (2) the prescribed mass of sorbent 125 may absorb one or more PFAS compounds from the liquid 103 via sorption to create a treated liquid. Because the cartridge 105 and effluent line 110b of the submersible pump 110 are positioned near or towards the surface 103a of the liquid 103, the prescribed mass of sorbent 125 may reduce the amount of PFAS concentrated near the surface 103a of the liquid 103 in the container 101.

Regarding the duration of treatment, in some embodiments, the drop-in treatment apparatus 100, 200 utilizing sorbent 125 is preferably activated between approximately 7 to 21 days. The duration of treatment will largely depend on the size of the container 101. For example, in an exemplary embodiment, when utilizing a drum container 101, the duration of treatment may be between approximately 7 to 14 days. Upon completion of the treatment duration, the user may remove the drop-in treatment apparatus 100, 200 from the treated liquid, as shown in step 1225.

Finally, FIG. 12 shows that the method 1200 may comprise steps 1230, 1235, which are disposing the treated liquid (step 1230) and disposing the cartridge containing the prescribed mass of sorbent (step 1235), respectively. After the drop-in treatment apparatus 100, 200 is removed from the treated liquid (step 1225), the user may dispose the treated liquid (step 1230). This may be done by first analyzing the treated liquid for PFAS, water quality parameters, and other potential co-contaminants to ensure regulatory compliance with stormwater, surface water, or sanitary sewer discharge requirements prior to discharge to any of the previously mentioned streams. Step 1230 may also include verifying that PFAS concentrations have been reduced to levels below applicable regulatory values or waste acceptance criteria by, for example, the publically owned treatment works (POTW) or equivalent, such that the treated water may be disposed into the sanitary sewer system. The treated liquid may be further polished through an additional sorbent process, as needed. Additionally, the user may dispose the cartridge containing the prescribed mass of sorbent (step 1235). Given that a majority of the PFAS is bound to the sorbent 125, the PFAS may be removed by simply disposing the cartridge 125. Thus, proper disposal of the cartridge may include: thermal desorption, thermal destruction, chemical elution, or landfilling following solidification and stabilization. Proper disposal may also include properly packaging the spent cartridge and delivery to a permitted disposal facility per the jurisdiction of the locality the waste was generated.

Figure 13:
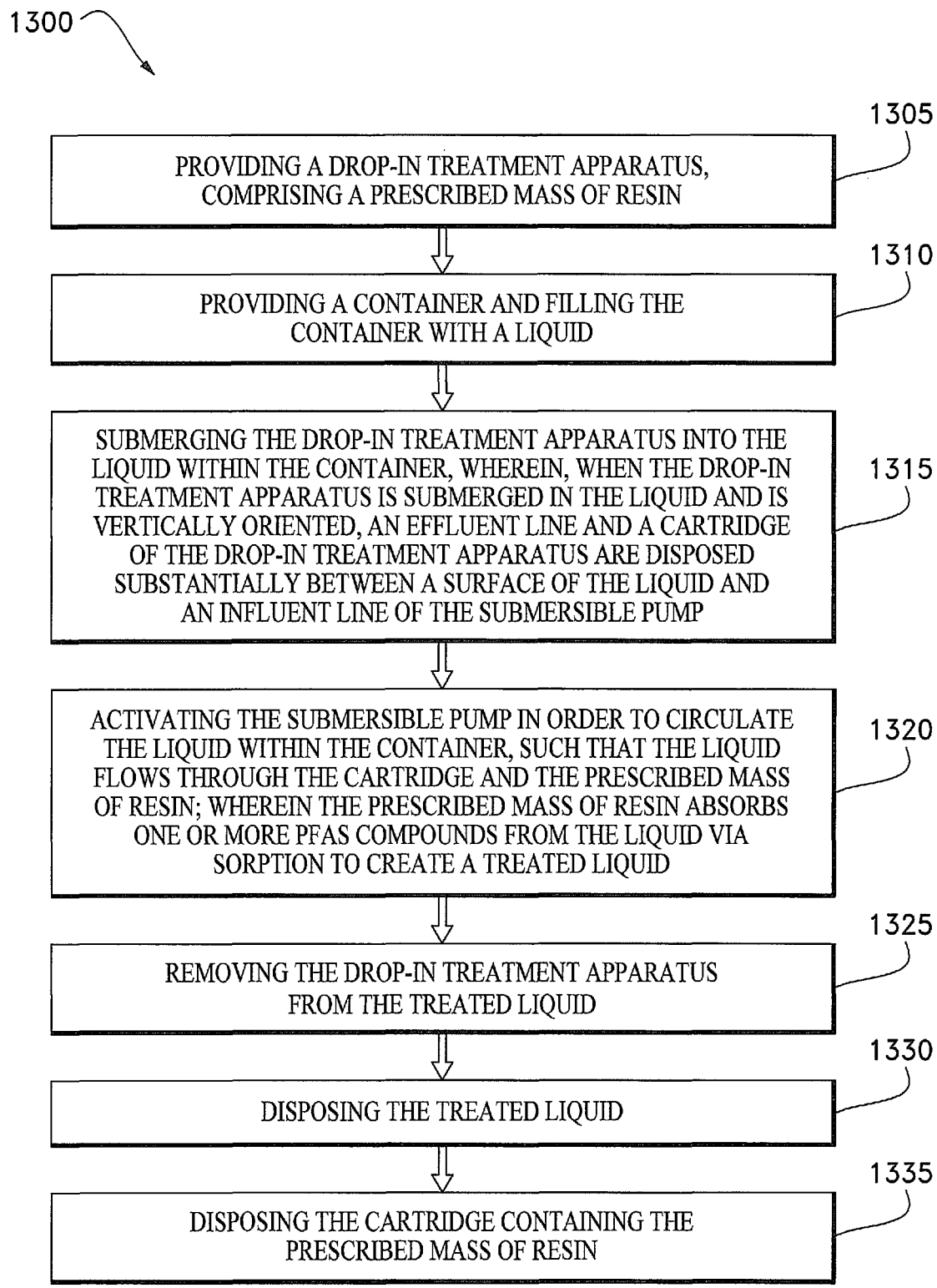
FIG. 13 is a flow chart of another embodiment of a method for treating PFAS-impacted liquids using a drop-in treatment apparatus.

FIG. 13 is a flow chart of another embodiment of a method 1300 for treating PFAS-impacted liquids 103 using a drop-in treatment apparatus 100, 200. As shown in FIG. 13, one embodiment of a method 1300 for treating PFAS-impacted liquids 103 using the drop-in treatment apparatus 100, 200 may comprise steps 1305, 1310, 1315, 1320, 1325, 1330, 1335. Unlike the embodiment shown in FIG. 12, an embodiment of the drop-in treatment apparatus 100, 200 may comprise a prescribed mass of resin 126. Specifically, FIG. 13 shows step 1305, which is providing a drop-in treatment apparatus 100, 200. Like the method 1200 discussed above, the drop-in treatment apparatus 100, 200 is preferably configured to remove PFAS from liquids in order to reduce the volume of PFAS-impacted waste requiring off-site disposal. This is preferably accomplished by concentrating PFAS onto various resins 126. In one embodiment, the drop-in treatment apparatus 100 may comprise a prescribed mass of resin 126, submersible pump 110, cartridge 105, mesh container 130, and power source 115. The prescribed mass of resin 126 may be configured to absorb one or more PFAS compounds from a liquid 103 via sorption and, in various embodiments, may range of approximately 0.1 to 100 mg per milliliter of the one or more PFAS compounds in the liquid. Like the previous embodiments, the submersible pump 110 may have an influent line 110a disposed at a lower end of the submersible pump 110 and an effluent line 110b disposed at an upper end of the submersible pump 110. The cartridge 105 may have a compartment configured to store the prescribed mass of resin 126 and may comprise multiple openings 106. The cartridge 105 may also be coupled to a downstream end of the effluent line 110b, such that the prescribed mass of resin 126 is in fluid communication with the effluent line 110b of the submersible pump 110. In various embodiments, the mesh container 130 may store the prescribed mass of resin 126, such that the mesh container 130 is disposed within the cartridge 105. The power source 115 may be electrically coupled to the submersible pump 110.

Additionally, like FIG. 12, FIG. 13 shows the next step 1310, which may be providing a container and filling the container with a liquid. Here, the container 101 is preferably used to store a liquid to be treated and is generally large enough to store a sufficient amount of liquid to have the resin 126 absorb one or more PFAS compounds from the liquid via sorption. Given that the resin 126 may absorb in the range of approximately 0.1 to 100 mg per milliliter of the one or more PFAS compounds in the liquid, the container 101 is preferably large enough to store up to 21,000 gallons of liquid. However, an exemplary embodiment of the container 101 is preferably a drum container configured to store up to approximately 55 gallons of a liquid, such that, the liquid 103 can be easily transported between sites and disposed of. The liquid is preferably liquid containing PFAS or PFAS-impacted liquid 103.

Like step 1215 of FIG. 12, FIG. 13 shows step 1315, which may be submerging the drop-in treatment apparatus into the liquid within the container. Here, when the drop-in treatment apparatus 100, 200 is submerged in the liquid 103, the drop-in treatment apparatus 100, 200 is preferably vertically oriented, as shown in FIGS. 3 and 6A to 6C. In particular, the drop-in treatment apparatus 100, 200 may be vertically oriented when the effluent line 110b and cartridge 105 of the drop-in treatment apparatus 200 are disposed substantially between a surface 103a of the liquid 103 and an influent line 110a of the submersible pump 110. That way, upon performing step 1320 (i.e., activating the submersible pump in order to circulate the liquid within the container), fluid located beneath the submersible pump 110 may be pumped into the influent line 110a and exit above the submersible pump 110 via the effluent line 110b. In this manner, (1) fluid or liquid 103 pumped into the submersible pump 110 may flow through the cartridge 105 and the prescribed mass of resin 126; and (2) the prescribed mass of resin 126 absorbs one or more PFAS compounds from the liquid 103 via sorption to create a treated liquid. Because the cartridge 105 and effluent line 110b of the submersible pump 110 are positioned near or towards the surface 103a of the liquid 103, prescribed masses of resin 126 may reduce the amount of PFAS concentrated near the surface 103a of the liquid 103 in the container 101.

Regarding the duration of treatment, in some embodiments, the drop-in treatment apparatus 100, 200 utilizing resin 126 is preferably activated between approximately 7 to 21 days. The duration of treatment will largely depend on the size of the container 101. For example, in an exemplary embodiment, when utilizing a drum container 101, the duration of treatment may be between approximately 7 to 14 days. Upon completion of the treatment duration, the user may remove the drop-in treatment apparatus 100, 200 from the treated liquid, as shown in step 1325.

Finally, FIG. 13 shows that the method 1300 may comprise steps 1330, 1335, which are disposing the treated liquid (step 1330) and disposing the cartridge containing the prescribed mass of sorbent (step 1335), respectively. After the drop-in treatment apparatus 100, 200 is removed from the treated liquid (step 1325), the user may dispose the treated liquid (step 1330). This may be done by first analyzing the treated liquid for PFAS, water quality parameters, and other potential co-contaminants to ensure regulatory compliance with stormwater, surface water, or sanitary sewer discharge requirements prior to discharge to any of the previously mentioned streams. Step 1330 may also include verifying that PFAS concentrations have been reduced to levels below applicable regulatory values or waste acceptance criteria by, for example, the POTW or equivalent, such that the treated water may be disposed into the sanitary sewer system. The treated liquid stream may be further polished through an additional sorbent process, as needed. Additionally, the user may dispose the cartridge containing the prescribed mass of sorbent (step 1335). Given that a majority of the PFAS is bound to the resin 126, the PFAS may be removed by simply disposing the cartridge 125. Thus, proper disposal of the cartridge may include: thermal desorption, thermal destruction, chemical elution, or landfilling following solidification and stabilization. Proper disposal may also include properly packaging the spent cartridge and delivery to a permitted disposal facility per the jurisdiction of the locality the waste was generated.

Figure 14:
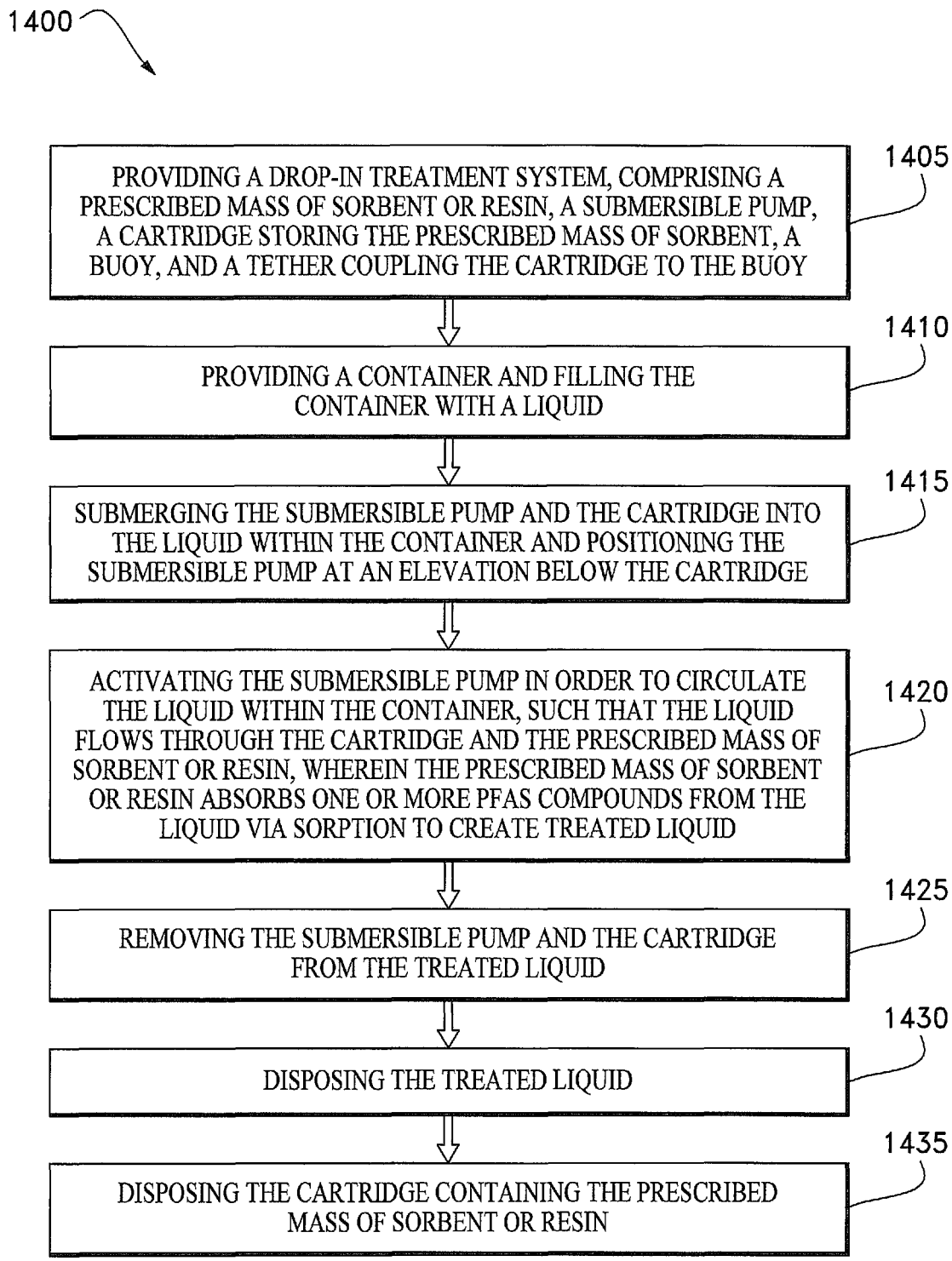
FIG. 14 is a flow chart of another embodiment of a method for treating PFAS-impacted liquids using a drop-in treatment system.

FIG. 14 is a flow chart of another embodiment of a method 1400 for treating PFAS-impacted liquids 103 using a drop-in treatment system 600, 700. As shown in FIG. 14, one embodiment of a method 1400 for treating PFAS-impacted liquids 103 using the drop-in treatment system 600, 700 may comprise steps 1405, 1410, 1415, 1420, 1425, 1430, 1435. Unlike the embodiments shown in FIGS. 12 and 13, an embodiment of the drop-in treatment system 700 may utilize a buoy 605 and tether 220, comprising a prescribed mass of sorbent 125 or resin 126, submersible pump 110, cartridge 105, mesh container 130, and power source 115. The prescribed mass of sorbent 125 or resin 126 may be configured to absorb one or more PFAS compounds from a liquid via sorption and, in various embodiments, may range of approximately 0.1 to 100 mg per milliliter of the one or more PFAS compounds in the liquid. The submersible pump 110 may have an influent line 110a disposed at a lower end of the submersible pump 110 and an effluent line 110b disposed at an upper end of the submersible pump 110. The cartridge 105 may have a compartment configured to store the prescribed mass of sorbent 125 or resin 126 and may comprise multiple openings 106. Importantly, the cartridge 105 may be directly coupled to the buoy 605 and not the downstream end of the effluent line 110b, unlike the previous embodiments. In this manner, the prescribed mass of sorbent 125 or resin 126 may be floating near the surface 103a of the liquid to be treated, but above the effluent line 110b of the submersible pump 110. In various embodiments, the mesh container 130 may store the prescribed mass of sorbent 125 or resin 126, such that the mesh container 130 is disposed within the cartridge 105. The power source 115 may be electrically coupled to the submersible pump 110.

Additionally, like FIGS. 12 and 13, FIG. 14 depicts the next step 1410, which may be providing a container and filling the container with a liquid. As described above, the container 101 is generally large enough to store a sufficient amount of liquid to have the sorbent 125 or resin 126 absorb one or more PFAS compounds from the liquid via sorption. Given that the sorbent 125 or resin 126 may absorb in the range of approximately 0.1 to 100 mg per milliliter of the one or more PFAS compounds in the liquid, the container 101 is preferably large enough to store up to 21,000 gallons of liquid. An exemplary embodiment of the container 101, however, is preferably a drum container configured to store up to approximately 55 gallons of a liquid in order to easily transport the treated liquid between sites for disposal. The liquid is preferably liquid containing PFAS or PFAS-impacted liquid 103.

Like steps 1215, 1315 of FIGS. 12 and 13, FIG. 14 shows step 1415, which may be submerging the submersible pump and the cartridge into the liquid within the container and positioning the submersible pump at an elevation below the cartridge. Here, when the submersible pump 110 and the cartridge 105 are submerged in the liquid 103, the submersible pump 110 is preferably positioned at an elevation below the cartridge 105. That way, upon performing step 1420 (i.e., activating the submersible pump in order to circulate the liquid within the container), fluid located beneath the submersible pump 110 may be pumped into the influent line 110a and exit above the submersible pump 110 via the effluent line 110b. In this manner, (1) fluid or liquid 103 pumped into the submersible pump 110 may flow through the cartridge 105 and the prescribed mass of sorbent 125 or resin 126; and (2) the prescribed mass of sorbent 125 or resin 126 absorbs one or more PFAS compounds from the liquid 103 via sorption to create a treated liquid. Because the cartridge 105 is positioned near or towards the surface 103a of the liquid 103, prescribed masses of sorbent 125 or resin 126 may reduce the amount of PFAS concentrated near the surface 103a of the liquid 103 in the container 101.

Regarding the duration of treatment, in some embodiments, the drop-in treatment system 600, 700 utilizing a sorbent 125 or resin 126 is preferably activated between approximately 7 to 21 days. The duration of treatment will largely depend on the size of the container 101. For example, in an exemplary embodiment, when utilizing a drum container 101, the duration of treatment may be between approximately 7 to 14 days. Upon completion of the treatment duration, the user may remove the drop-in treatment apparatus 100, 200 from the treated liquid, as shown in step 1425.

Finally, FIG. 14 shows that the method 1400 may comprise steps 1430, 1435, which are disposing the treated liquid (step 1430) and disposing the cartridge containing the prescribed mass of sorbent (step 1435), respectively. After the drop-in treatment system 600, 700 is removed from the treated liquid (step 1425), the user may dispose the treated liquid (step 1430). This may be done by first analyzing treated liquid for PFAS, water quality parameters, and other potential co-contaminants to ensure regulatory compliance with stormwater, surface water, or sanitary sewer discharge requirements prior to discharge to any of the previously mentioned streams. Step 1430 may also include verifying that PFAS concentrations have been reduced to levels below applicable regulatory values or waste acceptance criteria by, for example, the POTW or equivalent, such that the treated water may be disposed into the sanitary sewer system. The treated liquid may be further polished through an additional sorbent process, as needed. Additionally, the user may dispose the cartridge containing the prescribed mass of sorbent (step 1435). Given that a majority of the PFAS is bound to the sorbent 125 or resin 126, the PFAS may be removed by simply disposing the cartridge 125. Thus, proper disposal of the cartridge may include thermal desorption, thermal destruction, chemical elution, or landfilling following solidification and stabilization. Proper disposal may also include properly packaging the spent cartridge and delivery to a permitted disposal facility per the jurisdiction of the locality the waste was generated.

The foregoing description of the embodiments of the drop-in treatment apparatus, system, and method for PFAS-impacted liquids has been presented for the purposes of illustration and description. While multiple embodiments are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the drop-in treatment apparatus, system, and method are described in considerable detail, other versions are possible. Therefore, the spirit and scope of the appended claims should not be limited to the description of versions included herein.

What is claimed is:

1. A method for treating PFAS-impacted liquids, the steps comprising:
providing a drop-in treatment apparatus, comprising:
a prescribed mass of sorbent configured to absorb one or more PFAS compounds from a liquid via sorption, said prescribed mass of sorbent being in a range of approximately 0.1 to 100 mg per milliliter of said one or more PFAS compounds in said liquid;
a submersible pump having an influent line disposed at a lower end of said submersible pump and an effluent line disposed at an upper end of said submersible pump;
a cartridge having a compartment storing said prescribed mass of sorbent and comprising a plurality of openings, said cartridge being coupled to a downstream end of said effluent line, such that said prescribed mass of sorbent is in fluid communication with said effluent line of said submersible pump;
a mesh container storing said prescribed mass of sorbent, such that said mesh container is disposed within said cartridge; and
a power source electrically coupled to said submersible pump;
providing a container and filling said container with said liquid;
submerging said drop-in treatment apparatus into said liquid within said container, wherein, when said drop-in treatment apparatus is submerged in said liquid and is vertically oriented, said effluent line and said cartridge are disposed substantially between a surface of said liquid and said influent line of said submersible pump; and
activating said submersible pump in order to circulate said liquid within said container, such that said liquid flows through said cartridge and said prescribed mass of sorbent; wherein said prescribed mass of sorbent absorbs said one or more PFAS compounds from said liquid via sorption to create a treated liquid.

2. The method, according to claim 1, further comprising the step of: removing said drop-in treatment apparatus from said treated liquid.

3. The method, according to claim 1, further comprising the step of disposing said treated liquid.

4. The method, according to claim 1, further comprising the step of disposing said cartridge containing said prescribed mass of sorbent.

5. The method, according to claim 1, wherein said sorbent is selected from the group consisting of: pyrogenic carbon, granular activated carbon, biochar, zeolite, and aluminosilicates.

6. The method, according to claim 1, wherein the drop-in treatment apparatus further comprising a filtration cover substantially covering said cartridge.

7. The method, according to claim 1, wherein said container is a drum container configured to store up to approximately 55 gallons of said liquid.

8. A method for treating PFAS-impacted liquids, the steps comprising:
providing a drop-in treatment apparatus, comprising:
a prescribed mass of resin configured to absorb one or more PFAS compounds from a liquid via sorption, said prescribed mass of resin being in a range of approximately 0.1 to 100 mg per milliliter of said one or more PFAS compounds in said liquid and comprising a polymeric backbone crosslinked with one or more cationic functional groups;
a submersible pump having an influent line disposed at a lower end of said submersible pump and an effluent line disposed at an upper end of said submersible pump;
a cartridge having a compartment storing said prescribed mass of resin and comprising a plurality of openings, said cartridge being coupled to a downstream end of said effluent line, such that said prescribed mass of resin is in fluid communication with said effluent line of said submersible pump;
a mesh container storing said prescribed mass of resin, such that said mesh container is disposed within said cartridge; and
a power source electrically coupled to said submersible pump;
providing a container and filling said container with said liquid;
submerging said drop-in treatment apparatus into said liquid within said container,
wherein, when said drop-in treatment apparatus is submerged in said liquid within said container and is vertically oriented, said effluent line and said cartridge are disposed substantially between a surface of said liquid and said influent line of said submersible pump; and
activating said submersible pump in order to circulate said liquid within said container, such that said liquid flows through said cartridge and said prescribed mass of resin; wherein said prescribed mass of resin absorbs said one or more PFAS compounds from said liquid via sorption to create treated liquid.

9. The method, according to claim 8, further comprising the step of: removing said drop-in treatment apparatus from said treated liquid.

10. The method, according to claim 8, further comprising the step of disposing said treated liquid.

11. The method, according to claim 8, further comprising the step of disposing said cartridge containing said prescribed mass of resin.

12. The method, according to claim 8, wherein the drop-in treatment apparatus further comprising a filtration cover substantially covering said cartridge.

13. The method, according to claim 8, wherein said container is a drum container configured to store up to approximately 55 gallons of said liquid.

14. A method for treating PFAS-impacted liquids, the steps comprising:
providing a drop-in treatment system, comprising:
a prescribed mass of sorbent configured to absorb one or more PFAS compounds from a liquid via sorption, said prescribed mass of sorbent being in a range of approximately 0.1 to 100 mg per milliliter of said one or more PFAS compounds in said liquid;
a submersible pump having an influent line disposed at a lower end of said submersible pump and an effluent line disposed at an upper end of said submersible pump;
a cartridge having a compartment storing said prescribed mass of sorbent and comprising a plurality of openings;
a buoy;
a tether coupling said cartridge to said buoy, such that when said cartridge is submerged in said liquid, said cartridge is buoyed near a surface of said liquid and said prescribed mass of sorbent absorbs one or more PFAS compounds located near said surface of said liquid; and a power source electrically coupled to said submersible pump;

providing a container and filling said container with said liquid;

submerging said submersible pump and said cartridge into said liquid within said container and positioning said submersible pump at an elevation below said cartridge; and activating said submersible pump in order to circulate said liquid within said container, such that said liquid flows through said cartridge and said prescribed mass of sorbent, wherein said prescribed mass of sorbent absorbs said one or more PFAS compounds from said liquid via sorption to create treated liquid.

15. The method, according to claim 14, further comprising the step of: removing said submersible pump and said cartridge from said treated liquid.

16. The method, according to claim 14, further comprising the step of disposing said treated liquid.

17. The method, according to claim 14, further comprising the step of disposing said cartridge containing said prescribed mass of sorbent.

18. The method, according to claim 14, wherein said sorbent is selected from the group consisting of: pyrogenic carbon, granular activated carbon, biochar, zeolite, and aluminosilicates.

19. The method, according to claim 14, wherein the drop-in treatment apparatus further comprising a filtration cover substantially covering said cartridge.

20. The method, according to claim 14, wherein said container is a drum container configured to store up to approximately 55 gallons of said liquid.

\* \* \* \* \*